(12) United States Patent
Cortadella et al.

(10) Patent No.: US 8,433,875 B2
(45) Date of Patent: Apr. 30, 2013

(54) ASYNCHRONOUS SCHEME FOR CLOCK DOMAIN CROSSING

(75) Inventors: Jordi Cortadella, Gelida (ES); Luciano Lavagno, Turin (IT); Carlos Macian, Badalona (ES); Ferran Martorell, Barcelona (ES)

(73) Assignee: eSilicon Corporation, Sunnyvale, CA (US)

( * ) Notice: Subject to any disclaimer, the term of this patent is extended or adjusted under 35 U.S.C. 154(b) by 446 days.

(21) Appl. No.: 12/711,909

(22) Filed: Feb. 24, 2010

(65) Prior Publication Data

US 2011/0204932 A1      Aug. 25, 2011

(51) Int. Cl.
*G06F 12/00*        (2006.01)
(52) U.S. Cl.
USPC .......................................... 711/167; 327/145
(58) Field of Classification Search .................. 711/167; 327/145
See application file for complete search history.

(56) References Cited

U.S. PATENT DOCUMENTS 4,621,318 A * 11/1986 Maeda ........................... 711/158
6,141,765 A * 10/2000 Sherman ....................... 713/400

* cited by examiner

*Primary Examiner* — Yong Choe
(74) *Attorney, Agent, or Firm* — Stattler-Suh PC

(57) ABSTRACT

Apparatus and methods for clock domain crossing between a first clock domain and a second clock domain. The apparatus comprises a first control logic element for processing a handshake signal and producing a first arbiter input signal. Concurrently a second control logic element processes a second handshake signal and produces a second arbiter input signal. Exemplary embodiments include exactly one arbiter element inputting the first arbiter input signal, inputting the second arbiter input signal, outputting a first clocking signal to the first sequential element and outputting a second clocking signal to the second sequential element. For managing metastability by controlling the timing of the clocking inputs of the sequential devices, the apparatus includes a first controllable lock delay element selected to satisfy the setup constraint of the second sequential element, and a second controllable lock delay element selected to satisfy the hold constraint of the second sequential element.

14 Claims, 28 Drawing Sheets

ASYNCHRONOUS SCHEME FOR CLOCK DOMAIN CROSSING

FIELD OF THE INVENTION

The present invention relates to asynchronous logic circuits and, more particularly, to low-latency non-blocking communication circuits.

BACKGROUND OF THE INVENTION

In the design of systems with multiple clock domains, there is a need to transfer information from one clock domain to another. When exchanging transfer data from one clock domain to another several problems emerge, namely metastability and latency.

Metastability: When the two clocks involved in the transfer are independent, the receiving clock domain sees the incoming signal as an asynchronous signal. In this situation, it is necessary to use techniques to ensure the stability of the incoming signal when it is sampled and propagated through the circuit. A typical problem that occurs is when a signal is sampled by a flip-flop triggered by a clock from one domain for sampling data from another clock domain. That is, in the presence of metastability, a flip-flop might not stabilize to a known state within a certain amount of time, thus leading to circuits that produce different results even given the same logic states and inputs. One technique addressing signal stability is the use of synchronizers composed of a chain of flip-flops. Multiple flip-flops are connected together in a chain of a length intended to ensure a required low probability of failure due to metastability.

Latency: When exchanging transfer data from one clock domain to another, a handshaking mechanism is often used to deal with the unpredictability of the transfer time. This handshake is implemented by a pair of signals, one from the sender to the receiver (request) and another from the receiver to the sender (acknowledge). The delay imposed by the handshaking circuitry including the aforementioned chain of flip-flops introduces latency. This latency penalty occurs in each direction and each time transfer data is exchanged between the two clock domains. In some cases the latency for a message (i.e. request and acknowledgement) results in a handshaking latency of four to six cycles or more. In modern systems, a latency of such a magnitude is regarded as a severe timing constraint. In fact, this increased latency may reduce the actual throughput below the generally desired level of one cycle per cross-domain data transfer.

The aforementioned technique of using a chain of flip-flop synchronizers might be acceptable in the special case where the channel (i.e. multiple clock domain exchange circuitry) involved in the data transfers is not in a critical loop of the system, and thus the latency might not impact overall system performance. As an example, a critical loop would exist in the communication between a processing unit and a memory in which addresses are sent from the processing unit to the memory and data are sent from the memory to the processing unit. The loop would be critical if the processing unit would have to halt and wait for the arrival of the data after the address was sent to the memory. Another technique that mitigates the communication latency is the use of asynchronous FIFOs (also called bi-synchronous FIFOs). This technique reduces the latency by decoupling the reading and writing actions since synchronization in only one direction is required (i.e. 2 or 3 cycles to read the "empty" or "full" control signals of the FIFO). Still, crossing clock domains with FIFOs may become a bottleneck in the system if the crossing is in a critical loop.

Asynchronous systems offer new opportunities to implement clock domain crossing mechanisms with reduced latency since the clocks that trigger the sequential elements can be stopped during the normal operation of the circuit. The capability of stopping the clocks enables the use of different techniques to deal with metastability relying on arbitration modules (e.g., mutual exclusion (mutex) elements).

Prior attempts at exchanging transfer data from one clock domain to another clock domain between asynchronous systems have included use of FIFOs designed to work in real-time systems in which the processes for sending and receiving data cannot be blocked for an undefined period of time. To handle the time independence between the reader and the writer, and provide quick response times, mechanisms for addressing the behaviors of data loss and re-reading of old data have been proposed. Such designs use one slot of data storage (e.g. a latch) with a handshaking control to keep track of the validity of the information in the latch. The scheme can be extended to multiple data slots by concatenating them. However, this approach requires arbitration modules (e.g. one or more mutex modules) at the input and also at the output of the FIFO. In the input channel (e.g. for writing), the arbitration separates the request to write from the acknowledgement to accept new data in the FIFO. In the output channel (e.g. for reading), the arbitration separates the request to read from the acknowledgment of data availability in the FIFO. Further highlighting aspects of this approach, this scheme also requires additional latches at the input and at the output of the FIFO.

Designers of electronic systems would prefer only one arbitration module and would prefer designs that do not require latches at the input and output channels.

Moreover, prior proposals have included constraining assumptions and/or egregious limitations that motivate the present disclosure. Thus, it is the advancement of the art and mitigation of the limitations of such prior proposals that motivate the present invention disclosed herein.

SUMMARY OF THE INVENTION

Disclosed herein are apparatus and methods for clock domain crossing between a first clock domain and a second clock domain that are driven by pausible clocks and controlled with handshakes. In one embodiment, an apparatus comprises a first control logic element for processing a handshake signal and producing a first arbiter input signal. Concurrently a second control logic element processes a second handshake signal and produces a second arbiter input signal. Exemplary embodiments include exactly one arbiter element, the arbiter element inputting the first arbiter input signal, inputting the second arbiter input signal, outputting a first clocking signal to the first sequential element and outputting a second clocking signal to the second sequential element. For managing metastability by controlling the timing of the clocking inputs of the sequential devices, the apparatus includes a first controllable lock delay element selected to satisfy the setup constraint of the second sequential element and a second controllable lock delay element selected to satisfy the hold constraint of the second sequential element.

DETAILED DESCRIPTION

Figure 1:
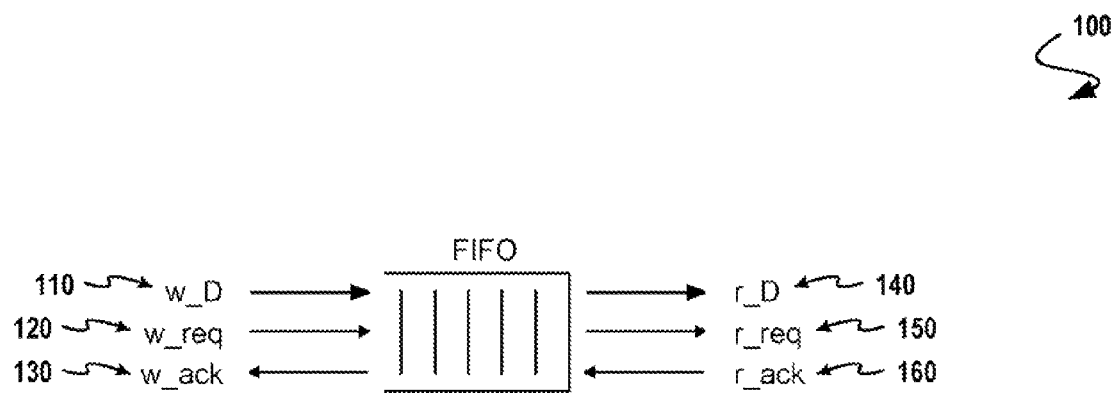
FIG. 1 depicts a diagram of a FIFO and its interface with asynchronous handshakes.

As fabrication techniques for electronic systems advance, so does the likelihood that a given electronic system will comprise multiple subsystems, each subsystem based on differing clocking schemes. For example, a system might comprise multiple synchronous subsystems (e.g. a heterosynchronous design) in which each of the synchronous subsystems might operate at precise integer multiples of clock speeds or, more likely, each of the synchronous subsystems might drift slightly from the design frequency, resulting from manufacturing and/or environmental variations. Other systems might combine subsystems in some mixture presenting synchronous as well as asynchronous interfaces while each of the subsystems operates within its own clock domain. Still other systems might include one or more subsystems that are designed using pausible clocks.

In any of the above cases, operation of the system demands reliable and high-performance (e.g. low latency, high bandwidth) communication of data (e.g. data signals, control signals, data from a sequential element, data from multiple sequential elements, etc) between one clock domain and another clock domain. However, one problem to be addressed in communicating data between clock domains is ensuring that data from a first clock domain is stable during a finite period before a clock-in edge of the second domain occurs (e.g. during the set-up period) and remains stable during a finite period after the clock-in edge of the second domain occurs (e.g. the hold period). A violation of either a set-up or a hold timing constraint can introduce a metastability period in the data signal during which period the data is indeterminate (e.g. unstable). One technique to minimize the probability of occurrence of a metastability period is to use a series of flip-flops in a synchronizer configuration.

Flip-Flop Synchronizers

One of the most popular techniques to ensure signal stability is the use of synchronizers composed of a chain of flip-flops. For current technologies and clock frequencies, two flip-flops are sufficient to ensure stability in most cases. When transferring data from one clock domain to another, a handshaking mechanism is often used to deal with the unpredictability of the transfer time. This handshake may be implemented by a pair of signals, one from the sender to the receiver (request) and another from the receiver to the sender (acknowledge). However, the delay imposed by the transfer through the chain of flip-flops incurs a latency of two or three cycles in each direction, which results in a potentially severe performance implication, namely that using a series of flip-flops in a synchronizer configuration allows sending new data only every four to six cycles.

Use of the solution of flip-flop synchronizers, thus incurring the aforementioned four- to six-cycle latency, might be acceptable if the channel involved in data transfers is not in a critical loop of the system. As an example, a critical loop would exist in the communication between a processing unit and a memory in which addresses are sent from the processing unit to the memory and data are sent from the memory to the processing unit. The loop would be critical if the processing unit would have to halt and wait for the arrival of data after the address was sent to the memory.

Bi-Synchronous FIFOs

Another solution for communicating clock domains is the use of bi-synchronous FIFOs (also called asynchronous FIFOs) with decoupled clock domains at the input and at the output. With bi-synchronous FIFOs it is possible to achieve a sustainable maximum throughput determined by the slowest clock. However, there is still a synchronization latency between sender and receiver similar to the one observed for the flip-flop synchronizers.

Moreover, the control circuit of the bi-synchronous FIFOs may require special circuit structures that are race-free. The reason is because certain parts of the control logic are triggered by different clock domains and could produce inconsistent information when sampled by one of the clock domains. In some cases, Gray codes are used to encode the counters that store the read and write addresses of the FIFO memory. Logic implemented using these special codes is often less efficient and/or harder to design, and thus less likely to be supported by logic synthesis tools and libraries than logic designed using the cardinal binary encoding and/or module-n counter circuits.

Elastic FIFOs for Asynchronous Circuits

Asynchronous circuits provide more efficient solutions for communication between different clocking domains since synchronization is performed using handshake signals between the clocking domains. In one embodiment, the handshake signals can be considered as local clocks that can be paused to wait for the arrival of other events or data. In the context of various embodiments of the invention, those FIFOs that interact with pausible clocks (also called stoppable clocks) are termed elastic FIFOs. The interaction with the environment (e.g. between clocking domains) is usually performed by means of pairs of handshake signals (e.g. a request handshake signal and an acknowledge handshake signal).

FIG. 1 depicts a diagram of a FIFO and its interface. The write channel includes a data signal, the w_D signal 110, and the handshake signals, the w_req signal 120 and the w_ack signal 130. Similarly, the read channel includes a data signal, the r_D signal 140, and the handshake signals, r_req signal 150 and r_ack signal 160.

Figure 2:
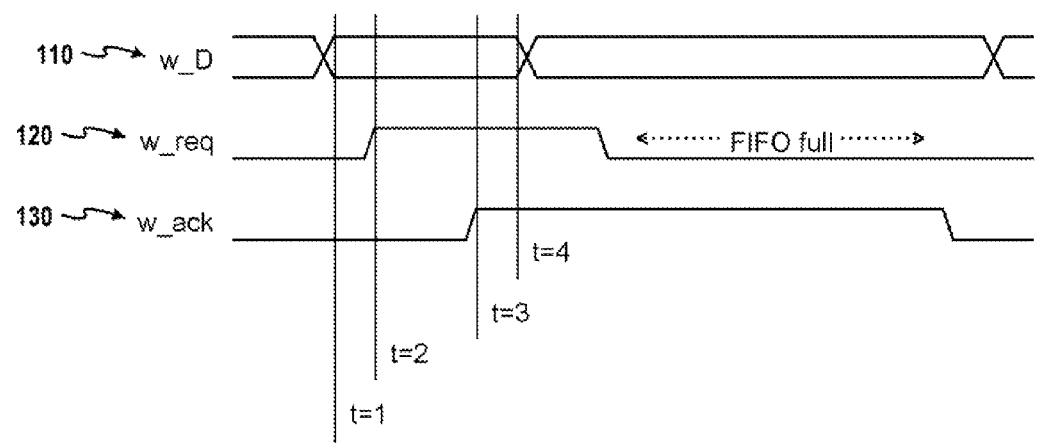
FIG. 2 depicts a timing diagram of the handshake protocol for writing data into a FIFO.

FIG. 2 depicts a timing diagram of the handshake protocol for writing data into a FIFO. A two-phase protocol illustrates the interaction of the FIFO with the environment. As shown, w_D signal 110 is driven to a stable value by time t=1, after which a w_req signal 120 is asserted at time t=2, while w_D remains stable. At time t=3 the w_ack signal 130 handshake signal is asserted; still while w_D signal remains stable at least until time t=4. Thus the handshake of a write request w_req signal and a write acknowledge w_ack signal is designed to ensure that the data signal to be transmitted, w_D signal, is clocked into a sequential element of the FIFO. A similar protocol would apply for reading data from the FIFO.

The timing diagram of FIG. 2 also depicts a situation in which the FIFO blocks the sender (i.e. delaying the w_ack signal) because of the lack of internal storage space (FIFO full). In this case, a blocking period will persist for as long as the FIFO is full, which period is determined by the speed of the read channel to accept new data.

Non-Blocking Elastic FIFO (nFIFO)

The aforementioned blocking period may have a negative impact on the performance of the system. As an example, many advanced microprocessors can continue executing instructions even when the access to memory is blocked while waiting for data. This is the case of out-of-order execution and multi-threaded architectures.

Embodiments of the present invention include a low-latency non-blocking elastic FIFO (nFIFO) for use in domains controlled by pausible/stoppable clocks. Such an nFIFO provides a non-blocking acknowledge mechanism with control information associated to the completion of the operation. With this mechanism, an efficient elastic nFIFO is provided for those systems that require a non-blocking interaction with a communication channel.

Figure 3:
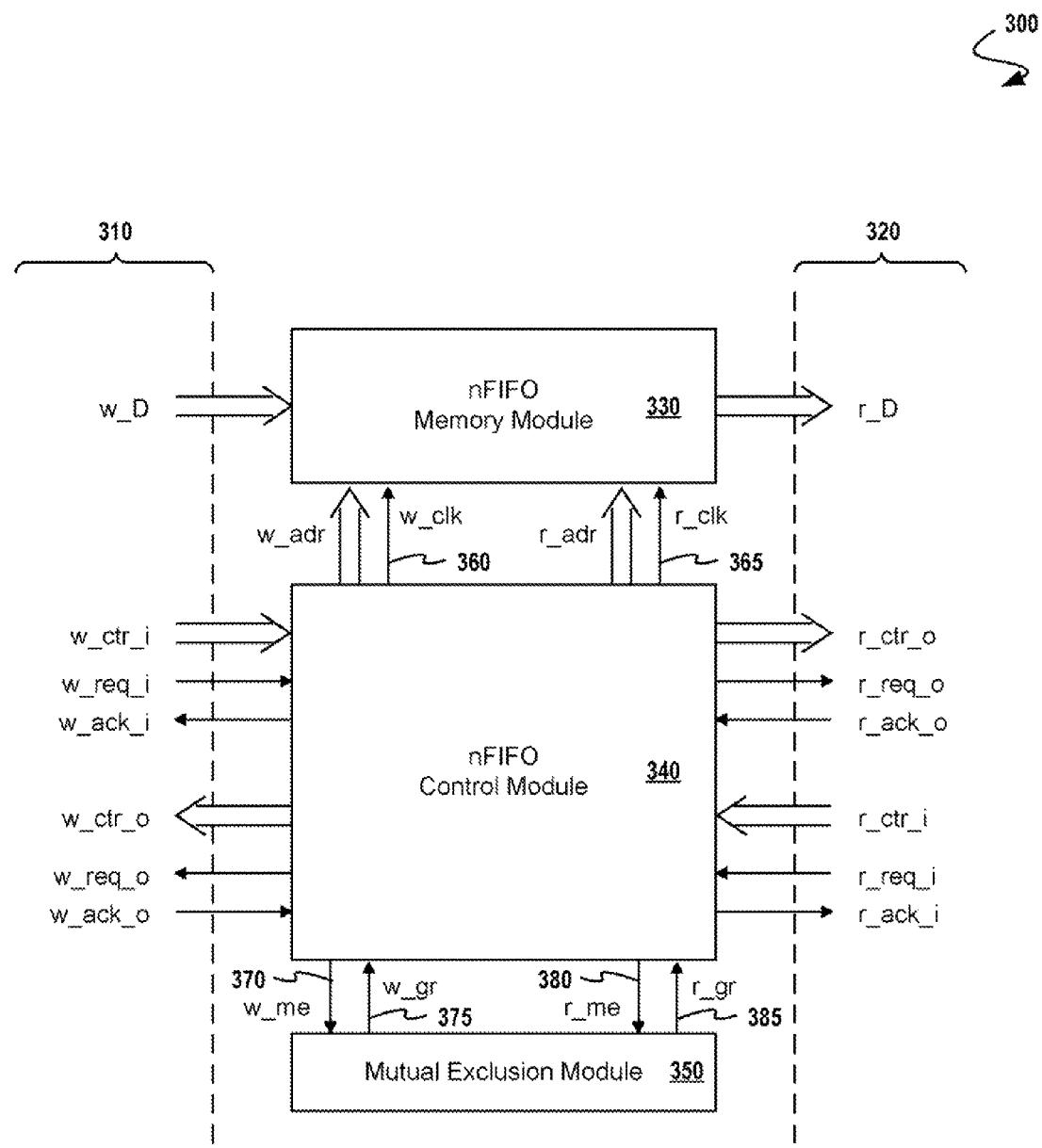
FIG. 3 is a block diagram of a non-blocking elastic FIFO, according to some embodiments.

FIG. 3 depicts a block diagram of a non-blocking elastic FIFO, according to some embodiments. There are two synchronization domains: a write synchronization domain 310 for writing data (including signals named with the prefix "w_") and another domain, a read synchronization domain 320, for reading data (including signals named with the prefix "r_").

As shown, the nFIFO comprises three modules:

An nFIFO memory module 330: The nFIFO memory module 330 stores the data to be transferred from the write to the read domain.

An nFIFO control module 340: The nFIFO control module 340 manages the handshakes with the sender and receiver of data. It also generates the control signals (e.g. address signals and clock signals) for the memory.

A mutual exclusion module 350: The mutual exclusion module 350 arbitrates access to the control logic in such a way that the write and read domains produce consistent control signals. As shown, write and read accesses are requested via a mutual exclusion write request signal w_me 370 and a mutual exclusion read request signal r_me 380. A grant for write or read access is provided by the corresponding grant signal, namely a mutual exclusion write request grant signal w_gr 375 and a mutual exclusion read request grant signal r_gr 385 (also see FIG. 6).

The nFIFO Memory Module

The nFIFO memory module 330 stores the incoming data according to an access policy. For example, an access policy might describe a first-in first-out access policy. Other access policies are possible and envisioned (e.g. LIFO access policy, random access policy, etc). Different implementations are possible for this module. For example, for low latency communication, one way to implement the nFIFO memory module 330 is by means of a direct-access memory (e.g. DRAM) with two ports—one for reading and another for writing. The control module keeps and updates the addresses for reading and writing from/to the direct-access memory. In some embodiments, managing the read and write addresses is facilitated by organizing the direct-access memory as a circular buffer with n locations. In this way, the generators of the direct-access memory addresses can be implemented as modulo-n counters (e.g. a modulo-n up-down counter). However, other implementations are also possible. For nFIFOs demanding only a small number of locations, an implementation of memory locations based on flip-flops might be used.

Synchronization between the nFIFO control module 340 and the nFIFO memory can be done using clocks (e.g. w_clk signal 360, r_clk signal 365) for the write and read channels, respectively. In some embodiments, the r_clk signal 365 might not be necessary if the read data is always available at the channel.

Figure 4:
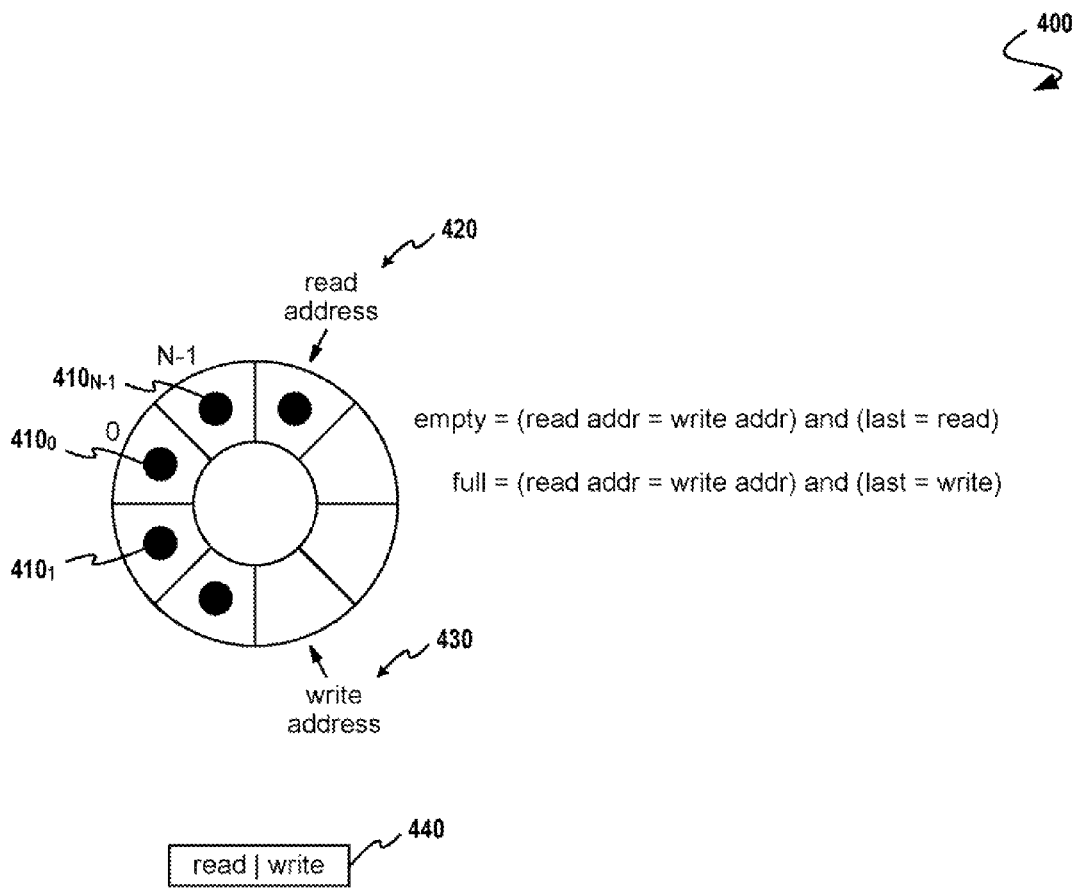
FIG. 4 is an abstract representation of a type of FIFO memory implemented as a circular buffer, according to some embodiments.

FIG. 4 depicts an abstract representation of an nFIFO memory implemented as a circular buffer. The solid dots $410_0$-$410_{N-1}$ represent memory locations with valid data. Two pointers (e.g. read address pointer 420, write address pointer 430) indicate the locations where data must be written into or read from. When the two pointers coincide (e.g. point to the same location), one of these two conditions may hold—the buffer is full or the buffer is empty. The type of condition can be determined by the value of the last operation performed, that is, based on the value in register 440. When the last operation performed in register 440 indicates the last operation performed was a write, then the buffer is full, otherwise the buffer is empty.

The Mutual Exclusion Module

Another component of the nFIFO is the mutual exclusion module 350 that arbitrates or otherwise guarantees exclusive access to the control logic for the write and read operations, which operations come from different clock domains. In some embodiments, the mutual exclusion operation is performed by an arbitration module called a mutex that is metastability-free upon an arbitrary arrival of the inputs.

Figure 5:
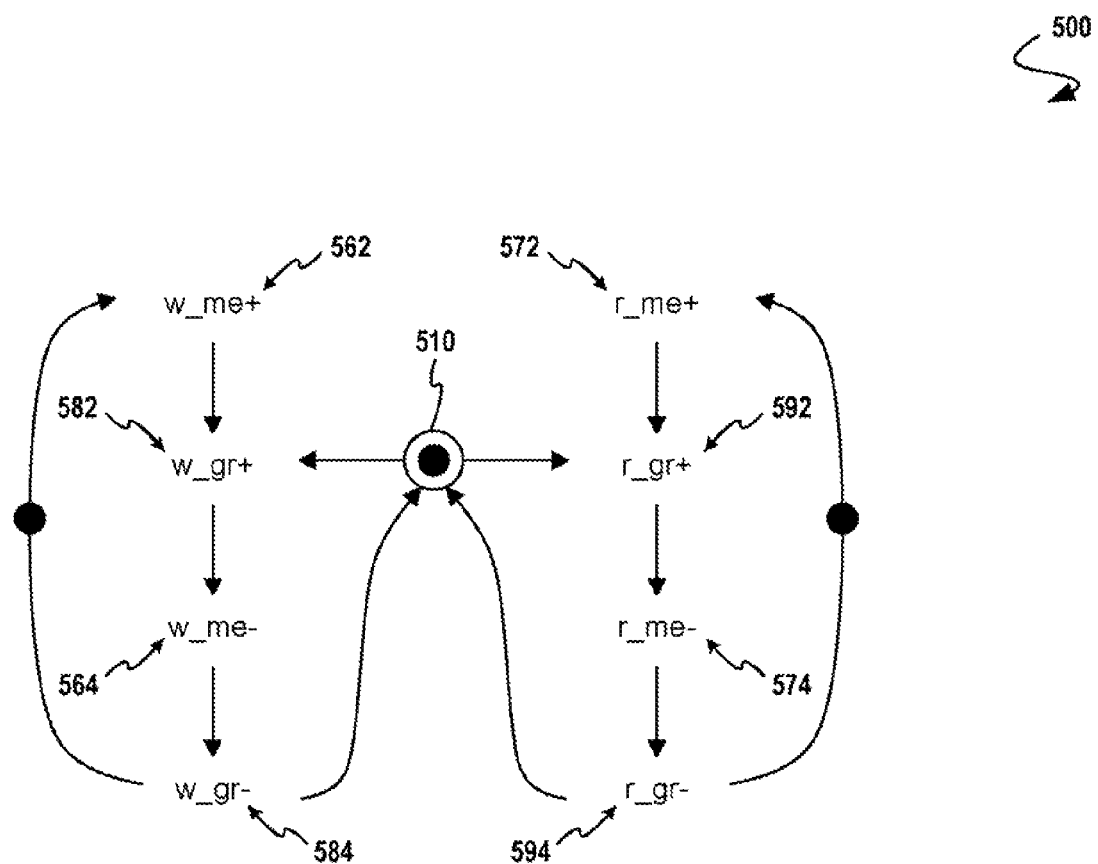
FIG. 5 is a signal transition graph depicting the behavior of a mutex module, according to some embodiments.

FIG. 5 is a signal transition graph (STG) depicting the behavior of a mutex module, according to some embodiments. As shown, the STG 500 depicts signal transitions where the events with suffix "+" represent rising transitions of the signals and the events with suffix "−" represent falling transitions. Those skilled in the art will recognize an STG as a class of Petri nets.

The pairs of signals (w_me, w_gr) and (r_me, r_gr) implement a four-phase handshake protocol. The w_me signal makes a request to access a critical resource for a write operation. The r_me signal makes a request to access a critical resource for a read operation. In an exemplary case, the critical resource is the control logic for the nFIFO. The w_gr signal indicates when the write access is granted. The r_gr signal indicates when the read access is granted. The implementation of a mutex circuit guarantees that only one access is granted at any one time (thus, mutual exclusion). This is indicated by the choice operator 510 of the STG that prevents w_gr and r_gr from being asserted simultaneously. The exclusive access is guaranteed between the gr+ and the gr− events of the corresponding request.

More explicitly, the rising edge of a mutual exclusion write request signal w_me 370 is shown as w_me+ 562, and the falling edge of a mutual exclusion write request signal w_me 370 is shown as w_me− 564. The rising edge of a mutual exclusion read request signal r_me 380 is shown as r_me+ 572, and the falling edge of a mutual exclusion read request signal r_me 380 is shown as r_me− 574.

Similarly, the rising edge of a mutual exclusion write request grant signal w_gr 375 is shown as w_gr+ 582, and the falling edge of a mutual exclusion write request grant signal w_gr 375 is shown as w_gr− 584. The rising edge of a mutual exclusion read request grant signal r_gr 385 is shown as r_gr+ 592, and the falling edge of a mutual exclusion read request grant signal r_gr 385 is shown as r_gr− 594.

Figure 6:
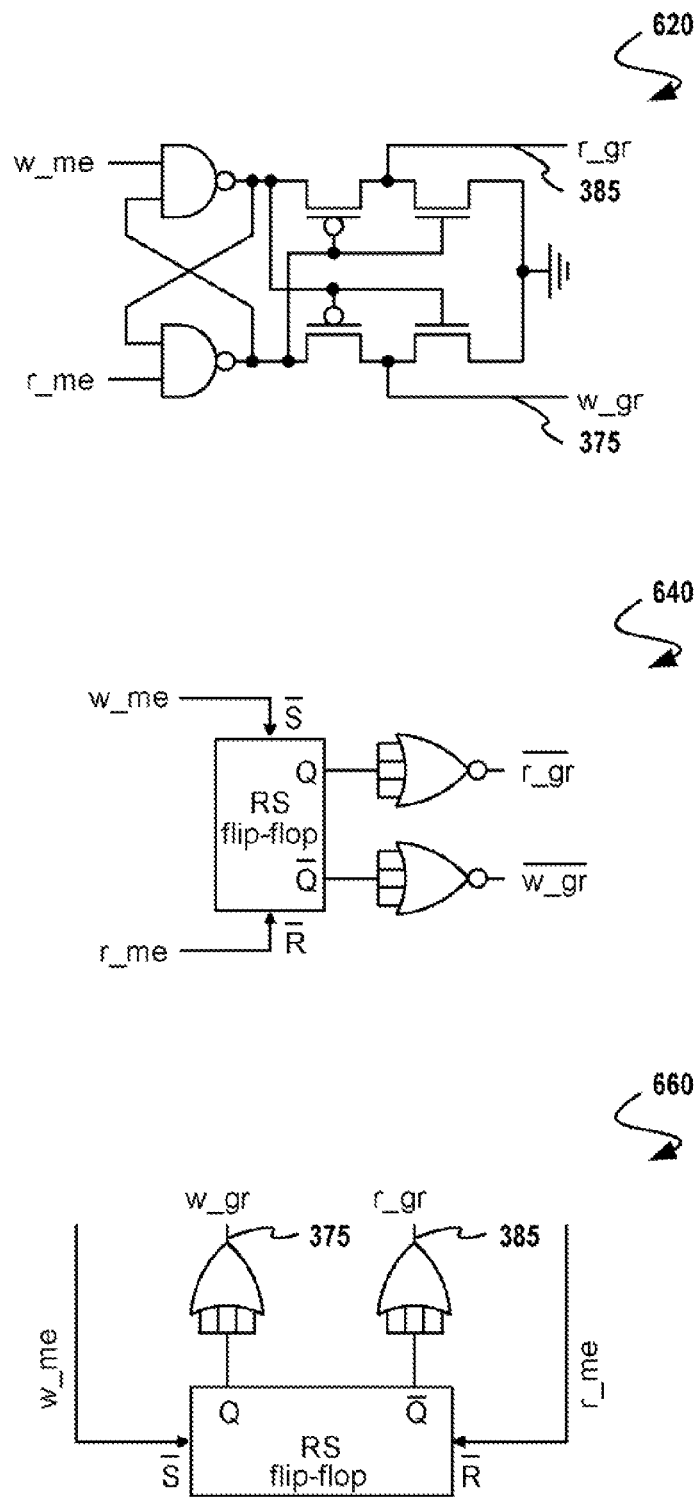
FIG. 6 depicts various implementations of a mutex, according to some embodiments.

FIG. 6 depicts various implementations of a mutex, according to some embodiments. The CMOS implementation 620 uses CMOS transistors and logic gates. The conventional gate implementation 640 uses conventional gates from a standard cell library. The conventional gate implementation with an alternative symbol 660 may be implemented using conventional gates from a standard cell library. As shown, an RS flip-flop is used with the assumption that both R (reset) and S (set) are dominant. As shown, Q and _Q are assumed to be zero when R and S are zero. It is statistically possible that metastability can be manifested at the two outputs of the flip-flop if R and S are raised nearly simultaneously. In this situation, the four-input NOR gates at the outputs of the flip-flops act as metastability filters. A possible alternative implementation for arbitration of request signals involves the use of an RGD arbiter (not shown) that interacts with a two-phase protocol.

An arbitration module like a mutex takes a finite amount of time to respond when the two requests arrive close enough. The probability p for a mutex to take a time longer than t to respond can be represented by the following expression:

$$p(t)=e^{(tc-t)/\tau}$$

where τ and tc are parameters that depend on the design of the circuit and on the closeness of the arrival of the request signals. If the time t to resolve is long enough, the probability p(t) may become extremely small; thus one can consider this situation to occur only very rarely (e.g. once every 100 years). This analysis might lead to the conclusion that this arbitration time might be acceptable for systems with synchronous clocks as long as the period to perform an operation in the FIFO is sufficiently long (e.g. in low-frequency systems).

The Control Module

The nFIFO control module 340 of the non-blocking elastic FIFO 300 has the following characteristics:

1) The nFIFO control module 340 is able to interact with the environment to synchronize the read and write operations through handshake and control signals.
2) The nFIFO control module 340 is able to interact with the memory module to provide the read/write addresses and the synchronization signals.
3) The nFIFO control module 340 is able to interact with the mutex to guarantee the atomicity of the read/write operations in the control logic.

The behavior of the nFIFO control module 340 is asynchronous; the nFIFO control module 340 has to reconcile the write and read operations in such a way that the internal state of the control circuitry is at all times consistent. For this reason, the events associated with the read and write operations must interact with an arbiter (e.g. the aforementioned mutual exclusion module 350) that prevents a concurrent access to the critical logic.

Figure 7:
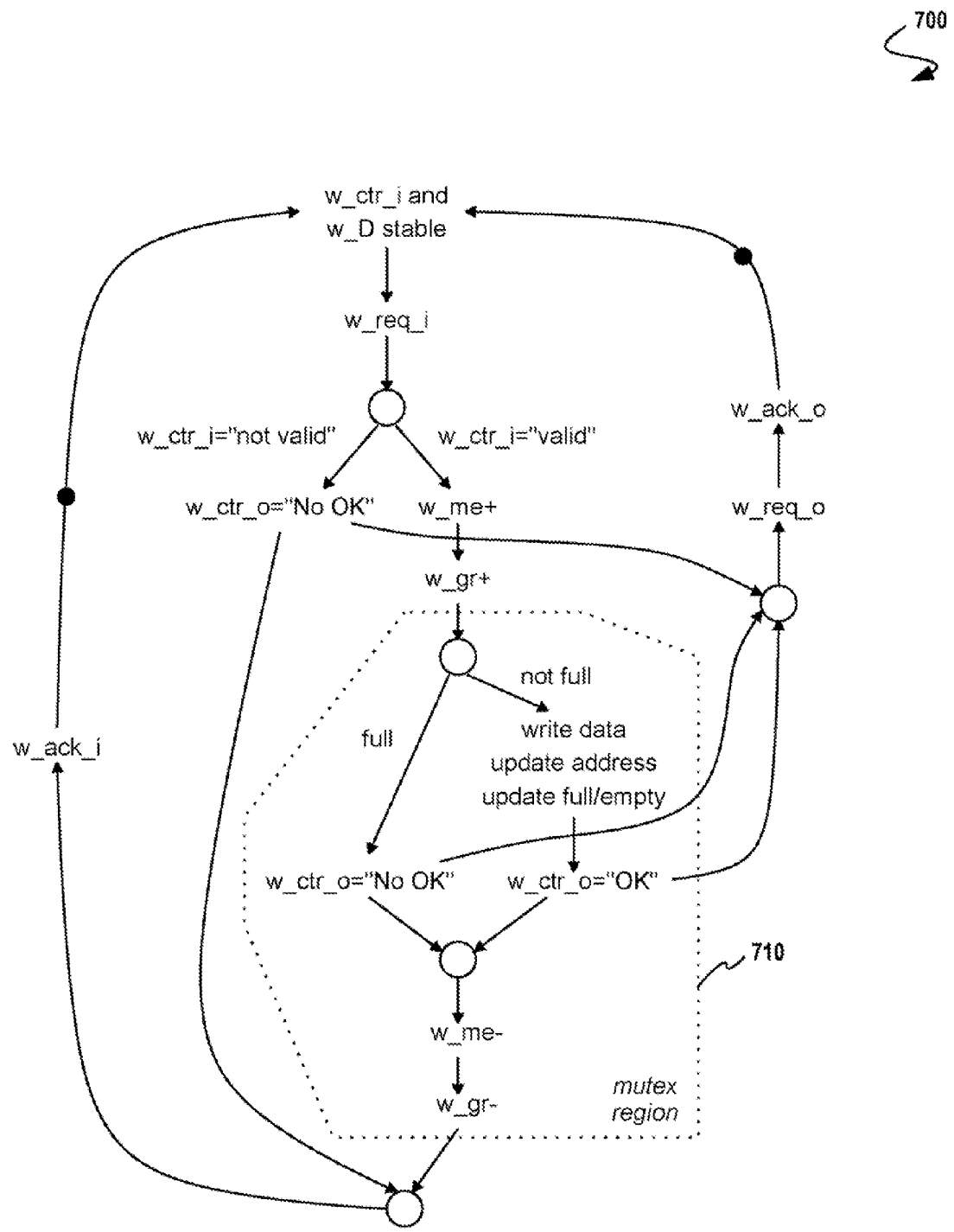
FIG. 7 is a signal transition graph depicting the behavior of an nFIFO control module for processing write operations, according to some embodiments.

FIG. 7 is a signal transition graph depicting the behavior of an nFIFO control module for processing write operations, according to some embodiments. As shown, handshake signals that interact with the mutex for a write operation (i.e. w_me, w_gr) operate with a four-phase protocol. The events on these signals contain the suffix "+" (rising transition) or "−" (falling transition). Those signals not containing any suffix operate in a two-phase protocol. The name of the signal in the graph represents an event (either a rising edge transition event or a falling edge transition event). Some other control signals are represented symbolically. The attribute stable (e.g. w_D stable) indicates that the value of the signal (possibly a multi-wire signal) is stable at that time.

As described herein, an nFIFO control module contains some state information (e.g. a register, a memory cell, etc) to indicate whether the FIFO is full or empty. This state information can be as simple as two state bits. In some embodiments, more complex state information might be stored, such as the number of data items stored in the FIFO, or such as which data items have been written but not yet read, etc. The nature and representation of this state information may depend on the type of state information that must be provided to the environment.

The Write Operation

The STG in FIG. 7 depicts a possible behavior for the write operation. The two tokens (shown as large solid dots) on the arcs represent the initial state in which the signals w_ctr_i and w_D (data) are changing. They become stable after the firing of the topmost event in the figure (w_ctr_i and w_D stable).

After stabilizing the control and data information, the sender issues a request (w_req_i). At this point, the control may indicate two types of actions: (a) an indication to send the data at w_D to the FIFO or, (b) an indication of not doing anything with the data. In various implementations such an indication may be provided by a handshake circuit for returning control information about the completion of the operation (e.g. empty/full information, number of items, or any status information, etc.)

In the former case, the signal w_ctr_i may carry some information indicating the validity of the data. This is represented symbolically by the condition w_ctr_i=valid. In the latter case, the signal w_ctr_i will carry some indication of not doing any FIFO operation at the write channel. In its simplest implementation, the w_ctr_i signal could be simply implemented with one signal wire indicating the valid/non-valid information.

In case of valid data, access to the critical control logic will be requested via the rising edge of the w_me signal (i.e. the w_me+ event). Permission will be granted via a rising edge of the w_gr signal (e.g. the w_gr+ event) when no read operation is active using the same control logic. During the period in which the access is granted (from w_gr+ to w_gr−), no read operation will be allowed to access the control logic. This period is represented by the outlined polygon (the write mutex region 710) shown in the STG.

Continuing the discussion of the STG, and specifically discussing the events within the write mutex region 710, at this point, two situations may occur: (i) the memory does have space to store the new incoming data or, (ii) the memory is full. In the former case, the operations related to writing one data item into memory are performed (e.g. generating a pulse on the write clock, updating the write pointer, and updating the full/empty state information).

Independent of whether the write operation had been successful or not, the control information is sent to the environment to indicate the result of the operation. In the STG, this is represented by the events w_ctr_o="OK" and w_ctr_o="No OK". The way this information is encoded may depend on the particular implementation of the nFIFO. For example, w_ctr_o could return information about the number of items stored in the FIFO, from which information the environment could deduce the successful completion of the operation.

In case of an unsuccessful write operation, the environment can freely decide how to proceed, e.g. by doing another attempt on the next handshake, discarding the data, or doing another attempt after a certain period of time. As aforementioned, many advanced systems can continue executing even when a particular access to a particular memory is blocked while waiting for data.

As shown in FIG. 7, the STG also includes the completion of the handshake for the input control information (w_ack_i) and the handshakes for the output control information (w_req_o and w_ack_o). Not every handshake on the w_ctr_i/w_ack_i signals requires an access to the write mutex region 710, but rather, only in the case when a write operation is required (w_ctr_i="valid"). Moreover the STG of FIG. 7 is merely one possibility for defining a handshake protocol. In particular, the order of some events could be changed by allowing a different concurrency with other events. For example, the event w_ack_o could be executed in parallel with the event w_ctr_i, thus substituting the arc w_ack_o->w_ctr_i by the arc w_ack_o->w_req_i. Other event order differences and other changes as represented in the STG are possible and envisioned.

The Read Operation

Figure 8:
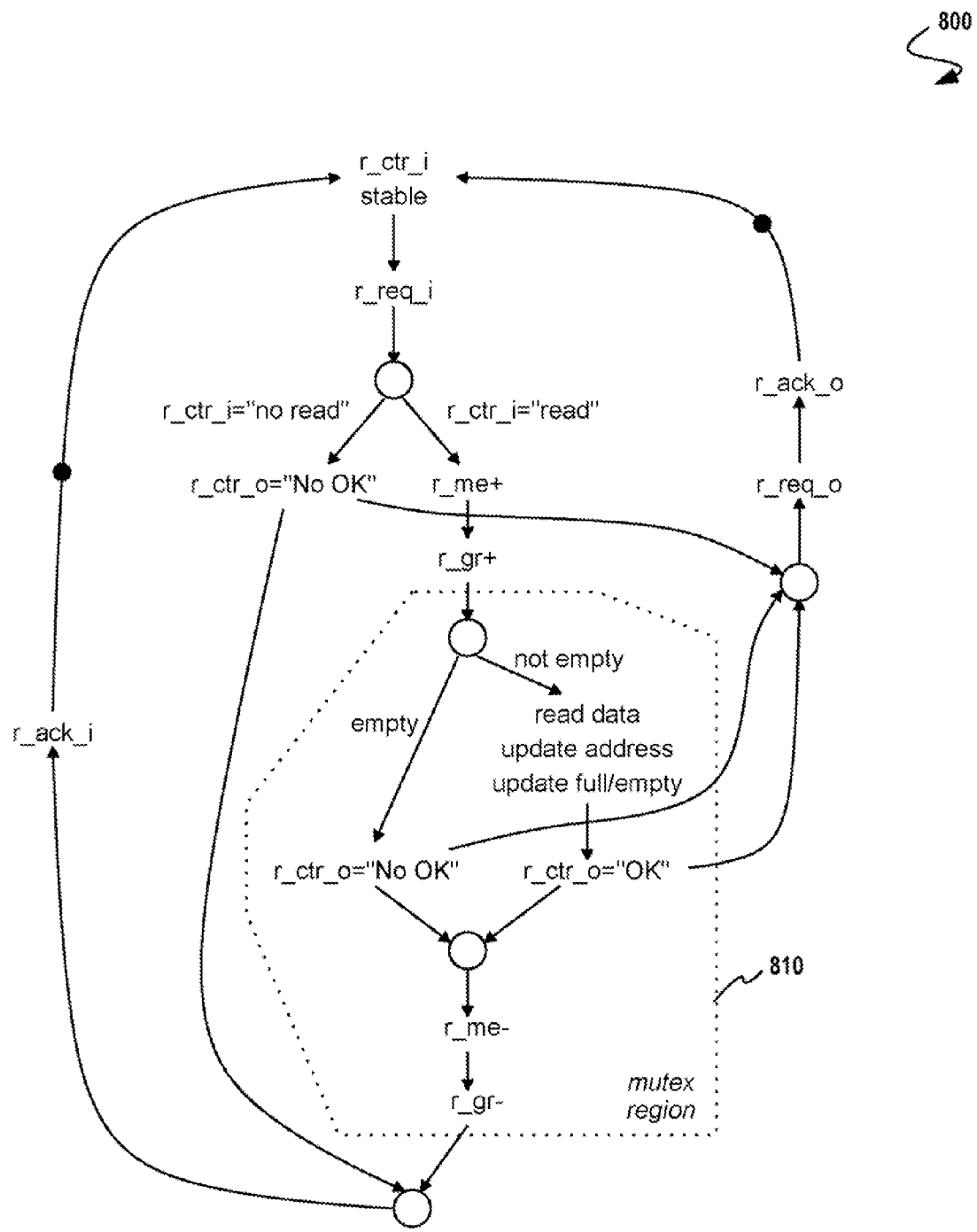
FIG. 8 is a signal transition graph depicting the behavior of an nFIFO control module for processing read operations, according to some embodiments.

FIG. 8 is a signal transition graph depicting the behavior of an nFIFO control module for processing read operations, according to some embodiments. As shown, handshake signals that interact with the mutex for a read operation (i.e. r_me and r_gr) operate with a four-phase protocol. The events on these signals contain the suffix "+" (rising transition) or "−" (falling transition). Those signals not containing any suffix operate in a two-phase protocol. The name of the signal in the graph represents an event (either a rising edge transition event or a falling edge transition event). Some other control signals are represented symbolically. The attribute stable (e.g. r_ctr_i stable) indicates that the value of the signal (possibly a multi-wire signal) is stable at that time.

The behavior of the read operation is congruent to the behavior of the write operation.

The intention to read data from the FIFO is indicated through the r_ctr_i signal via some (possibly encoded) information that indicates or implies a read operation. In its simplest implementation, this signal could be implemented with one wire indicating a read or no-read.

The request from the environment for a read access comes through the event r_req_i. Depending on the control information, the environment may signal an indication to read or not read from the FIFO. In the case of reading, exclusive access to the control logic will be requested to the read mutex region 810 (i.e. via event r_me+ and event r_gr+).

After the read access to the nFIFO control module is granted (e.g. via event r_gr+), two situations may occur: the FIFO has data available for reading, or the FIFO is empty. In the former case, the operations associated to the read operation are performed—data is read from memory, the next read address pointer (e.g. read address pointer 420) is updated, and the last operation state information is updated (e.g. by setting a value into register 440). As shown, the STG of FIG. 8 also includes the completion of the handshake for the input control information (r_ack_i) and the handshakes for the output control information (r_req_o and r_ack_o). As depicted, not every handshake on the r_ctr_i/r_ack_i signals requires an access to the read mutex region 810, but rather, only in the case when a read operation is required (r_ctr_i=read) is the read mutex region 810 entered.

Handshake Protocols

The behaviors shown in FIG. 7 and FIG. 8 are discussed using two-phase protocols for the pairs of handshake signals (except for the signals of the mutex). Similar behaviors can be defined using four-phase protocols within the system.

Similarly, interleaving of the different handshakes can be executed in different orders as long as they are consistent with the actions that read and modify the state information of the control logic. In particular, the events for the input control (w_req_i, w_ack_i) and for the output control (w_req_o, w_ack_o) of the write channel can be interleaved in different ways. Also, and strictly as another example, different interleaving permutations can be considered for the events of the input control (r_req_i, r_ack_i) and for the output control (r_req_0, r_ack_o) of the read channel.

Implementation of the Control Logic

Figure 9:
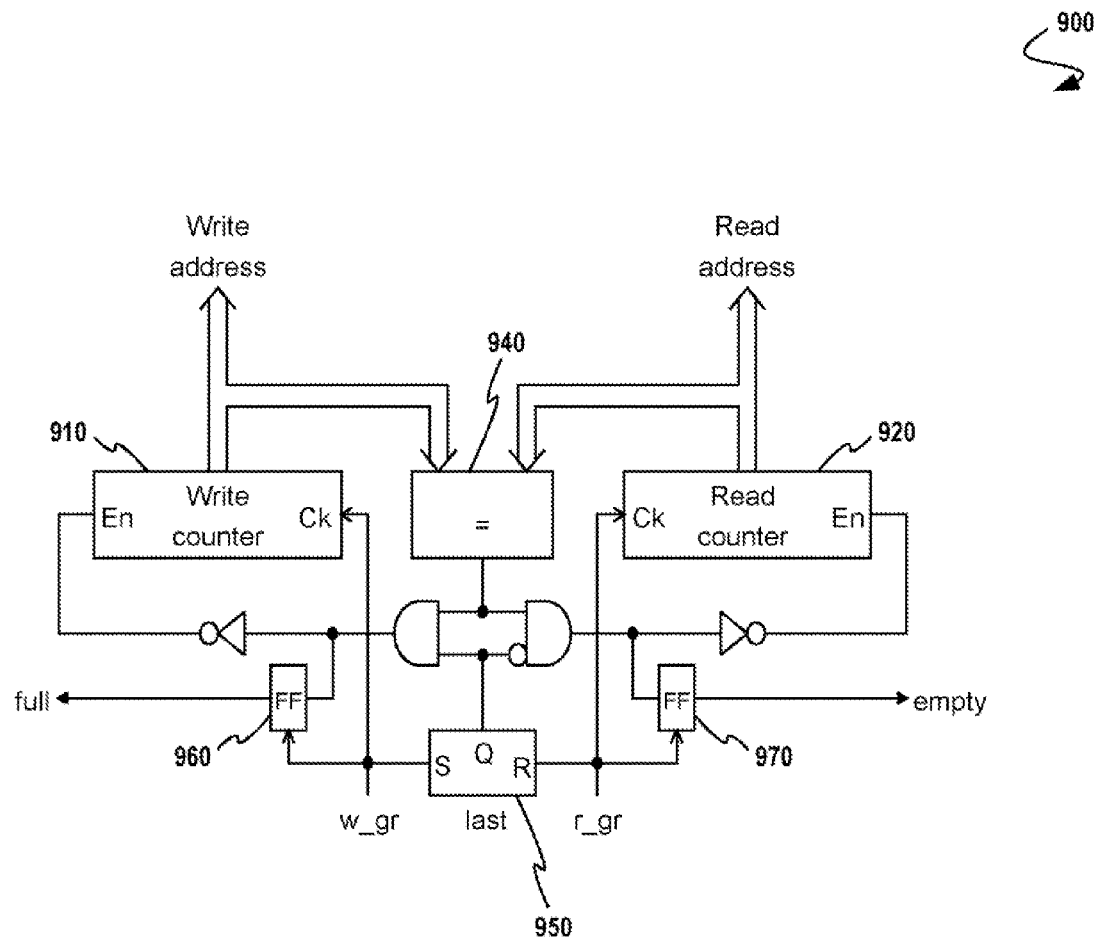
FIG. 9 is schematic of an implementation of FIFO control logic using a circular buffer, according to some embodiments.

FIG. 9 depicts an exemplary implementation of FIFO control logic using a circular buffer, according to some embodiments. As an option, the present system 900 may be implemented in the context of the architecture and functionality of FIG. 1 through FIG. 8. Of course, however, the system 900 or any structures therein may be carried out in any desired environment. As shown, FIFO control logic 900 includes a write counter 910 and a read counter 920 used to store counter values used as the read and write addresses, respectively, to access elements of a FIFO memory. As shown, these counters, namely the write counter 910 and the read counter 920, are triggered by the assertion of w_gr and r_gr signals when used as counter clock inputs. As earlier discussed, assertion of a grant signal (e.g. w_gr, r_gr) indicates permission to do a write or a read operation, respectively.

The write counter 910 and the read counter 920 also have an enable signal. The write counter 910 is enabled when the FIFO is not full and the read counter 920 is enabled when the FIFO is not empty. The FIFO control logic 900 also includes a comparator 940 that determines when the two addresses (i.e. the write address value of the write counter 910 and the read address value of the read counter 920) are equal. The last operation flip-flop 950 with the label "last" stores a Boolean value that indicates the type of the last operation. A write sets the value to 1, whereas a read resets the value to 0. The combination of the last operation flip-flop 950 with the value of comparator 940 (e.g. comparing equality of the input addresses) determines the value of the full and empty conditions. As shown, those conditions are stored in a full indication flip-flop 960 and an empty indication flip-flop 970.

To avoid a race condition, there should be a timing separation between the two signals w_gr and r_gr (which, as shown, are used as clocks). This timing separation thus allows the logic in and around one counter to stabilize between the arrival of one clock edge and the arrival of the next clock edge.

In exemplary embodiments, and as shown in the block diagram of FIG. 3, the signals "full" (output of the full indication flip-flop 960) and "empty" (output of the empty indication flip-flop 970) correspond to the output control information represented by the signals w_ctr_o and r_ctr_o.

The logic for the control of the FIFO buffer can be implemented using conventional digital logic gates. This is in contrast to bi-synchronous FIFOs in which this logic must be glitch-free regardless of the relative arrival of clock edges at the input and output channels.

Handshake Logic

Figure 10:
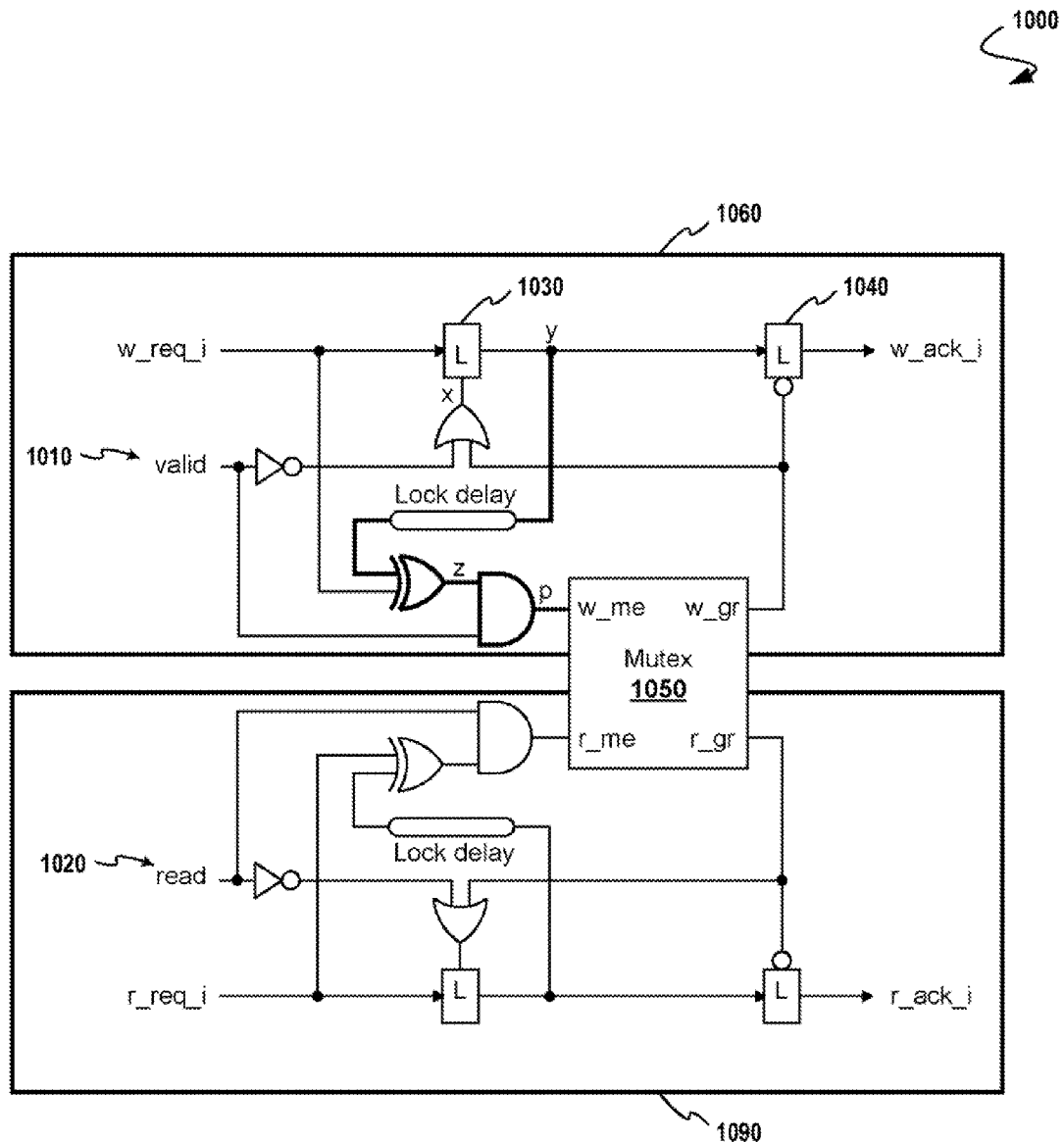
FIG. 10 is a depiction of an implementation for a mutex region controller that implements a handshake protocol for accessing a mutex region, according to some embodiments.

FIG. 10 is a depiction of an implementation for a mutex region controller that implements a handshake protocol for accessing a mutex region, according to some embodiments. As shown, the protocol employs the request signals and the acknowledge signals (e.g. w_req_i, w_ack_i, and r_req_i, r_ack_i) for synchronization. The valid signal 1010 corresponds to a value carried within the control information of signal w_ctr_i, for example, as shown in FIG. 3. That is, the environment has provided stable, valid data, and has indicated an intent to write to a shared FIFO. The read signal 1020 corresponds to a value carried within the control information of signal r_ctr_i, for example, as shown in FIG. 3. That is, the environment has indicated intent to read from a shared FIFO.

This particular implementation assumes a two-phase protocol in which the valid signal 1010 is stable before the arrival of the request event at w_req_i. The operation of the protocol is next explained considering the two possible values of the valid signal 1010.

When the valid signal 1010 is equal to logic zero, the two latches (i.e. the left write latch 1030 and the right write latch 1040) of the write control circuit 1060 are in transparent mode since the logic value at x=1 and the logic value of w_gr=0. Therefore, the arrival of w_req_i is transmitted to w_ack_i through the two transparent latches (i.e. the left write latch 1030, and right write latch 1040). In this case, no request to the mutex is sent since valid=0 enforces w_me=0. With this strategy, interference with requests from the read channel is minimized.

Considering a different logical case, specifically when the valid signal 1010 is equal to logic one, the following sequence of events is produced.

$$w\_req\_i \rightarrow z+ \rightarrow w\_me+ \rightarrow \text{arbitration delay} \rightarrow$$
$$w\_gr+ \rightarrow x+ \rightarrow y \rightarrow \text{lock delay} \rightarrow z- \rightarrow w\_me- \rightarrow$$
$$w\_gr- \rightarrow x- \rightarrow w\_ack\_i$$

One aspect of this sequence is that the lock delay can be adjusted in such a way that the control logic for the FIFO buffer (address counter and full/empty logic) can stabilize before another clock edge, either from the input channel (through w_gr+) or from the output channel (through r_gr+) arrives.

The selection of the lock delay is an important design parameter of this circuit. On one hand, it is desirable that the delay is short to reduce the likelihood of receiving a request from the other channel during the delay. On the other hand, the delay should be long enough to let the control logic stabilize. As previously presented, an arbitration module like mutex 1050 takes a finite amount of time to respond when the two requests arrive closely enough. The probability p for a mutex to take a time longer than t to respond can be represented by the following expression:

$$p(t) = e^{(tc-t)/\tau}$$

where $\tau$ and tc are parameters that depend on the design of the circuit and on the closeness of the arrival of the request signals. As such, selection of the lock delays can be made to correspond to a statistical certainty (e.g. a low probability that mutex 1050 would take a time longer than t to stabilize).

Considering the lock delay calculation in more detail, see the propagation delay values as shown in Table 1:

TABLE 1

| | Lock Delay Calculation Scenarios for an Elastic nFIFO | | | |
|---|---|---|---|---|
| Case | Combinational Propagation Delay to nFIFO | Worst-Case Settling Time for FIFO Control Logic | Propagation Delay from Y to P (without considering lock delay) | Selected Lock Delay Value (minimum) |
| Fast | 2 | 5 | 1 | 6 |
| Nominal | 4 | 5 | 1 | 8 |
| Slow | 6 | 10 | 1 | 15 |

Thus, a selected lock delay value may be calculated according to the following timing equation:

$$\text{lock\_delay}_{(MIN)} \geq \text{combinational\_propagation}_{(MAX)} + \text{FIFO\_settling}_{(MAX)} - \text{YtoP}_{(MIN)}$$

Of course, this is but one example, and both the values and the equation are merely illustrative. Other equations for selecting a lock delay value are reasonable and envisioned.

As discussed, FIG. 10 depicts the control logic for the handshake of the write channel, namely the write control circuit 1060. FIG. 10 also depicts the control logic for the handshake of the read channel, namely read control circuit 1090. The control logic for the read channel uses the r_me and r_gr signals to interact with the mutex 1050.

Figure 11:
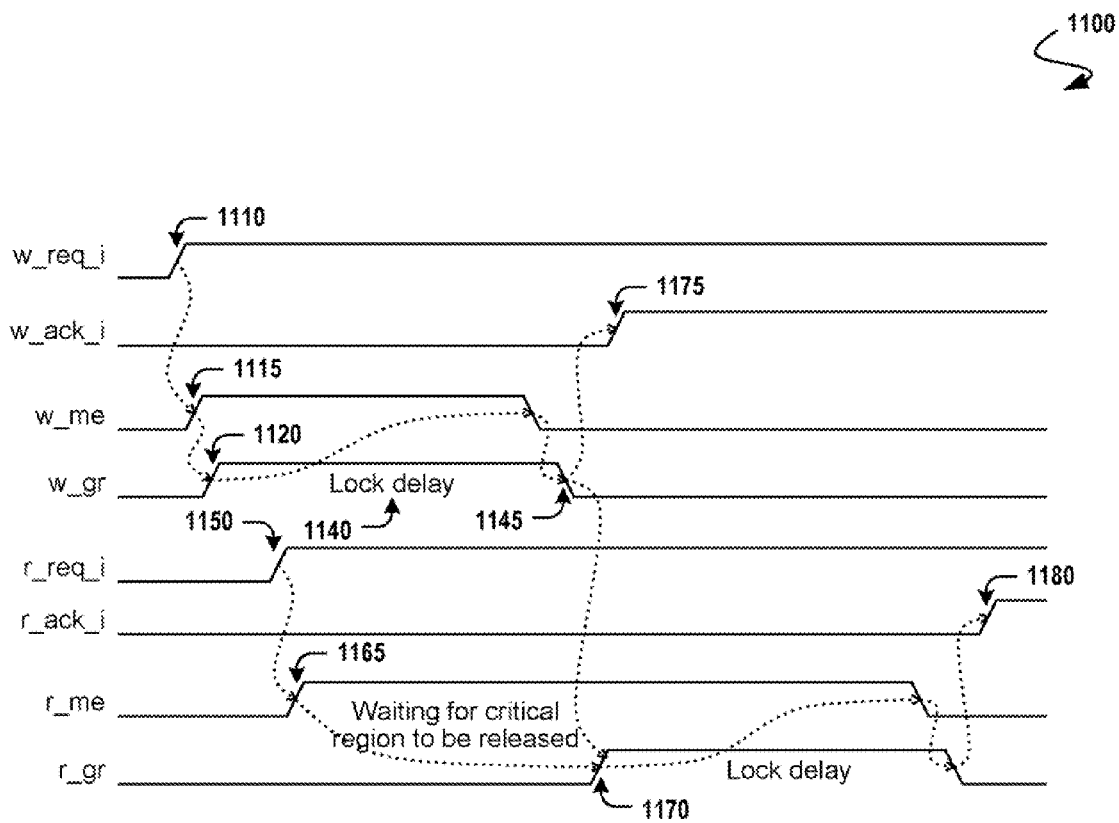
FIG. 11 is a waveform illustrating the interaction of the handshakes for the read and write channels, according to some embodiments.

FIG. 11 is a waveform illustrating the interaction of the handshakes for the read and write channels, according to some embodiments. In this example, a request to write event 1110 arrives (using w_req_i), generates a first request to modify the control logic event 1115 (using w_me+), and the mutex then directly generates a write grant permission event 1120 (using w_gr+). The period of time during which the FIFO control logic 900 is updated is represented by the lock delay 1140. Continuing this example, while the write channel is updating the control logic, a request to read event 1150 arrives (using r_req_i), which then generates a second request to modify the control logic event 1165 (using r_me+). In this case, permission is not granted directly by the mutex since the mutex is blocked by the write channel until the period of the lock delay 1140 expires. After the period of the lock delay 1140 expires, a deassert grant permission event 1145 is generated (using w_gr−), and a write grant permission event 1170 is generated (using r_gr+). The protocol proceeds, and a write request acknowledge event 1175 event (using w_ack_i) and a read request acknowledge event 1180 (using r_ack_i) are issued after the completion of the corresponding logic operations within the FIFO control logic 900.

Handshakes for the Output Control Information

Both the write and read channels provide information to the environment to report about the completion of the requested operation. This information is sent through the signals w_ctr_o and r_ctr_o and their corresponding handshake signals.

In various embodiments discussed herein, the control information is sent as soon as the operation is completed and is synchronized with the control handshake signals through a two-phase or four-phase protocol. The depiction and discussions of FIG. 7 and FIG. 8 indicate possible occurrences of events for the write channel (signals w_ctr_o, w_req_o, and w_ack_o) and for the read channel (signals r_ctr_o, r_req_o, and r_ack_o). Other possible interleaving permutations of these events with the other events are also conceivable as long as rules for maintaining the consistency of the information are observed.

Figure 12:
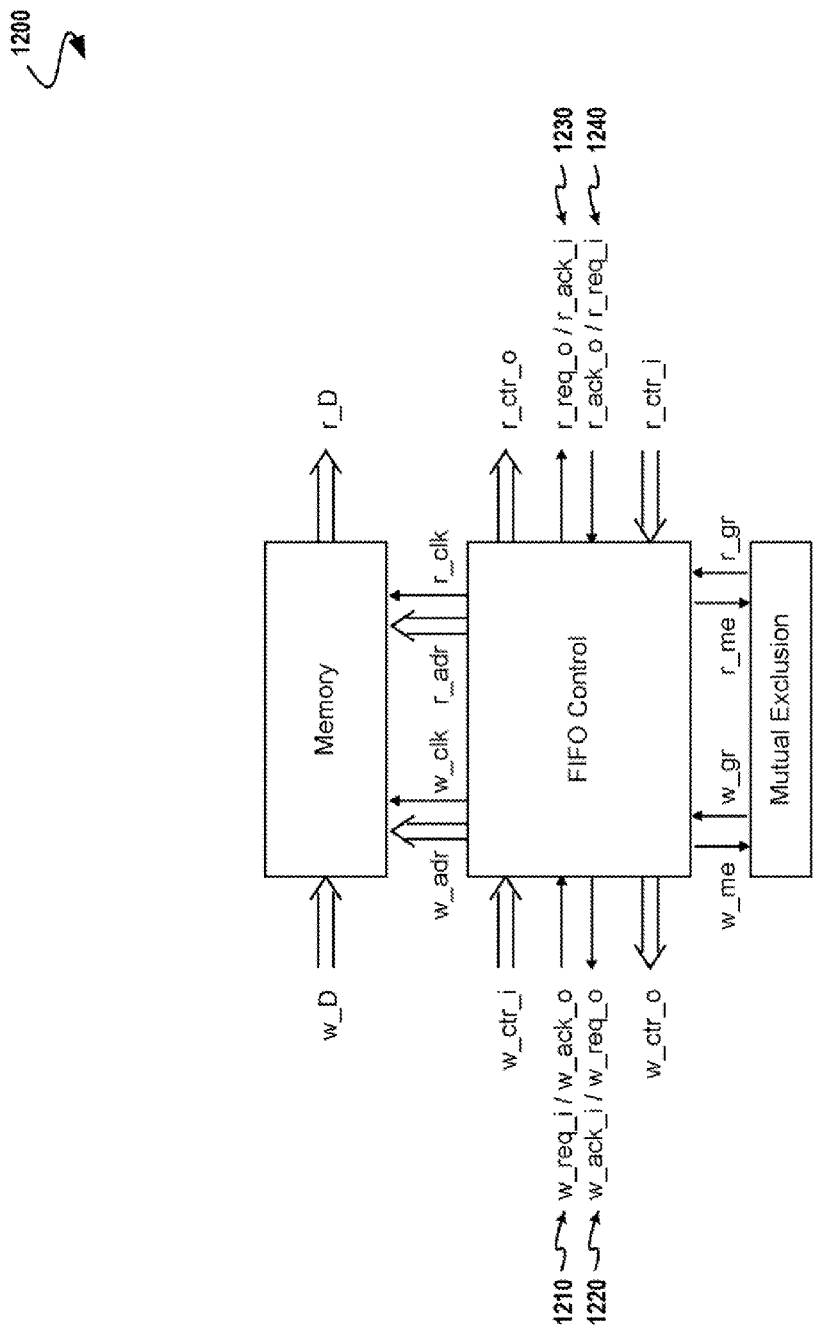
FIG. 12 depicts an optimization of handshake signals by employing re-use of handshake signals for a second use as input information between asynchronous input and output channels, according to some embodiments.

FIG. 12 depicts an optimization of handshake signals by employing re-use of handshake signals for a second use as input information between asynchronous input and output channels, according to some embodiments. As shown, the shared handshake signal non-blocking elastic FIFO of system 1200 implements sharing of request and acknowledgement signals. Specifically, the signals w_req_o and w_ack_o are shared with the signals w_ack_i and w_req_i, respectively. A similar optimization is shown for the read channel, wherein the signals r_req_o and r_ack_o are shared with the signals r_ack_i and r_req_i, respectively. See the shared write req_i signals 1210, and the shared write req_o signals 1220. Following this scheme, the occurrence of events for the control information is shown in FIG. 13, where the two STGs include the shared events for the handshake signals.

Figure 13:
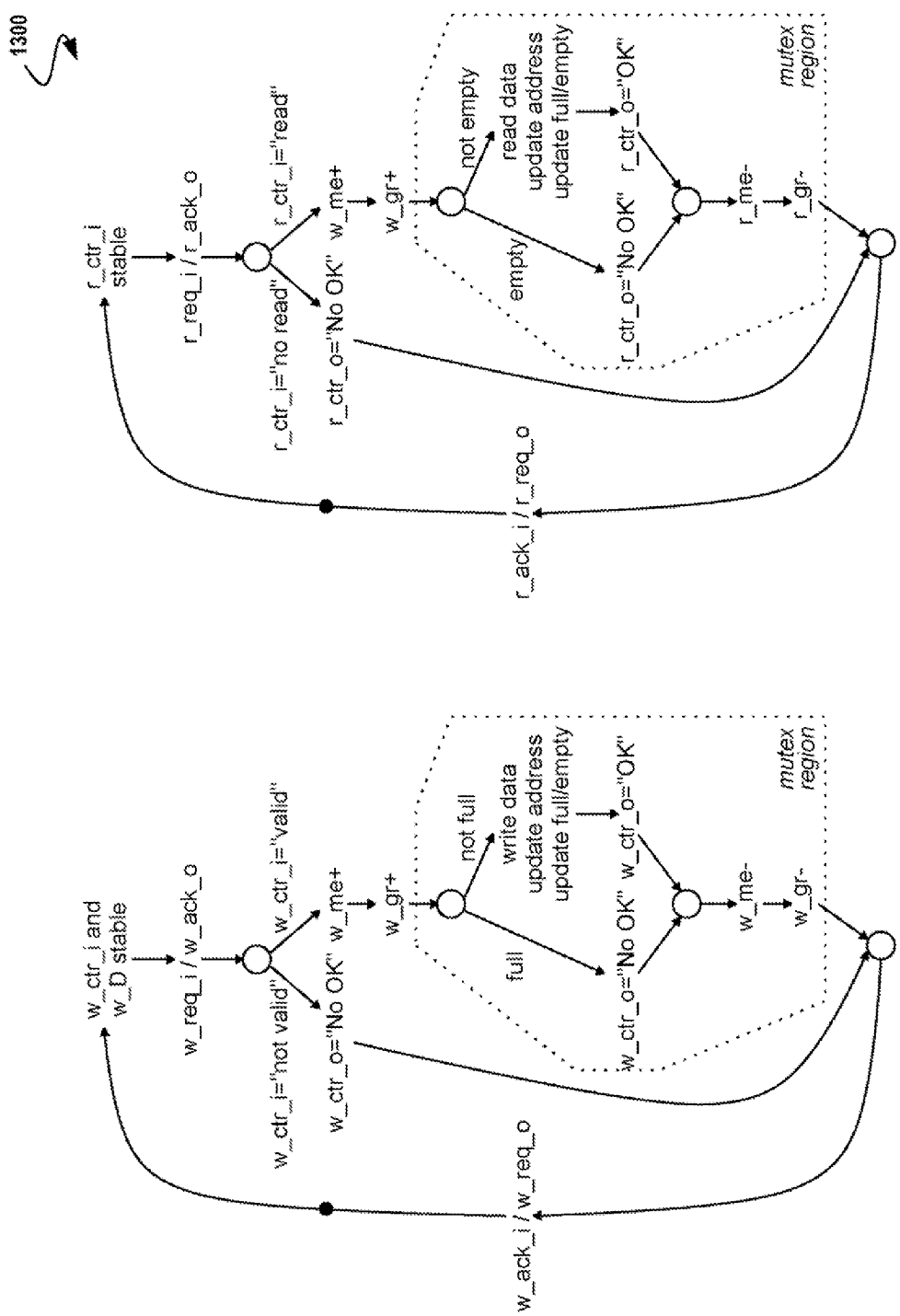
FIG. 13 shows signal transition graphs depicting event behavior using shared handshake signals, according to some embodiments.

FIG. 13 is a signal transition graph depicting event behavior using shared handshake signals, according to some embodiments. As shown, the signal transition graph exits the mutex region at the same point, regardless of the path taken within the mutex region. In other signal transition graphs, concurrency might be exploited such that the ctr_i and ctr_o signal transitions occur within the same time window.

Performance of the Elastic nFIFO

Another feature of the presented elastic nFIFO with regard to other FIFO designs is performance. The characteristics of performance in this context can be evaluated against two different aspects:

Throughput: Provided there is enough space in the FIFO buffer, this embodiment of the invention can sustain a throughput of one operation per cycle. This characteristic can be achieved by conventional FIFOs for synchronous and asynchronous circuits.

Latency: Embodiments of this invention have an average latency that is lower than the average latency of conventional FIFOs. According to embodiments of the invention, low latency is exhibited because of the absence of synchronizers for crossing different clock domains. Instead of using synchronizers, the mutex separates the delivery of the asynchronous clocks to the control logic. The latency is determined by the aggregate delays dominated by the delay of the mutex and the delay of the control logic. Moreover, disclosed here are techniques for reducing the aggregate delays by reducing dominant delays to be as small as possible while still maintaining a statistically reliable likelihood of stabilizing within an acceptable time period.

Therefore, the low-latency of this design contrasts with the 2- to 3-cycle latencies as are present for operation of prior art systems that need to synchronize different clock domains. Moreover, when the FIFO is located in one of the critical execution loops of the system, latency can be a crucial factor to determining the overall performance of such a system.

Interfacing with Synchronous Systems

From the general point of view, the elastic nFIFO presented in embodiments of this invention requires interaction with stoppable clocks given the non-deterministic delay that the mutex may manifest when trying to arbitrate two requests arriving at the same time, or arriving almost the same time. However, the response time of the mutex decreases exponentially as time to resolve an arbitration increases. When the probability of a mutex surpassing a certain amount of time to resolve becomes extremely low, that amount of time could be considered safe as a bound for response time. With this assumption, if the frequency of a synchronous system is sufficiently low, that system could be directly connected to the nFIFO with a guarantee that the nFIFO would respond within the cycle period. Of course, variations in the response time of the mutex may reduce the probability of a meta-stability-based failure (holding a given latency as a constant), or may reduce the latency (holding a given failure probability as a constant).

More precisely, if the frequency of a system clock domain is low enough such that there is sufficient time from the operation request (e.g. before a falling edge of the clock) until the completion of the operation (e.g. before the rising edge of the clock) for the mutex to resolve metastability and the control logic to stabilize, then that system could be directly connected to the nFIFO with a guarantee that the nFIFO would respond within the cycle period.

Still more precisely, the aforementioned non-deterministic delay may be selected in preference to reducing the probability of metastability failure (holding latency constant), or, the non-deterministic delay may be selected in preference to reducing the latency (holding a metastability failure probability constant).

Figure 14:
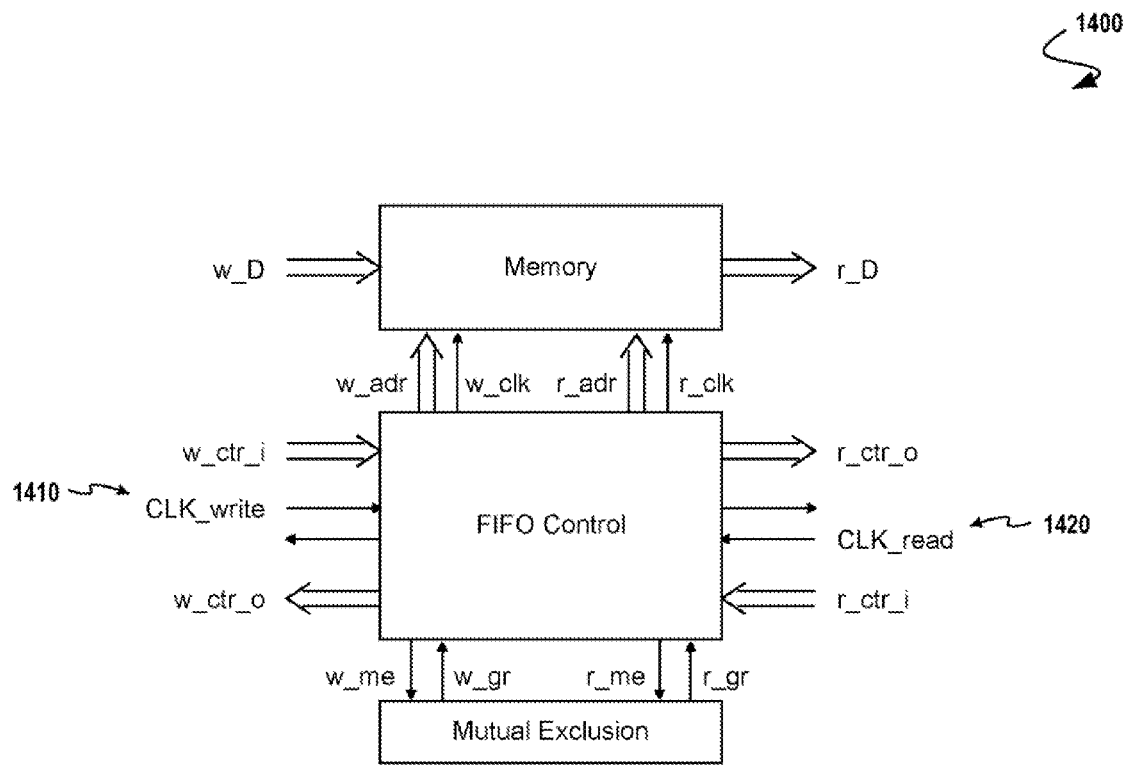
FIG. 14 depicts a scheme to connect synchronous systems to the read and write channels, according to some embodiments.

FIG. 14 depicts a scheme to connect synchronous systems to the read and write channels, according to some embodiments. The scheme is based on the one presented in FIG. 12. The w_req_i and r_req_i signals are connected to the clocks of each domain. See the signals at 1410 and 1420. The w_ack_i and r_ack_i signals remain dangling since the response time of the nFIFO is assumed to be sufficiently low to complete before the end of the current cycle.

Generalization to Clock Domain Crossing

The previous schemes involving elastic nFIFOs can be considered in a generalized clock domain crossing (CDC). elastic circuits. In some cases, when using handshake circuits between different clock domains, the operating frequency of both domains is the same, thus working in a similar way as synchronous circuits do. To work at independent frequencies in a decoupled way, the control module shown in FIG. 16 can be used. The asynchronous handshake signals are routed through a mutual-exclusion element 1610 to guarantee a sufficient amount of time-wise separation. This amount of time-wise separation is enforced by the lock delays LOCKi and LOCKj that may be selected according to the worst-case propagation of signals starting from the sequential elements of the sending clock (CLKi) to the sequential elements of the receiving clock (CLKj). The lock delays must ensure that the receiving clock edge does not arrive before the combinational logic Dij 1606 has stabilized (setup constraint) and that the sending clock edge does not send new data that can overwrite the one in the logic Dij.

TABLE 2

Lock Delay Calculation Scenarios for Centralized Clock Separation

| Case | Combinational Propagation Delay to Mutex | Worst-Case Settling Time for Clock Buffer Logic | Propagation Delay from Gi to Li (without considering lock delay) | Selected Lock Delay Value (minimum) |
|---|---|---|---|---|
| Fast | 2 | 5 | 1 | 6 |
| Nominal | 4 | 5 | 1 | 8 |
| Slow | 6 | 10 | 1 | 15 |

Figure 15:
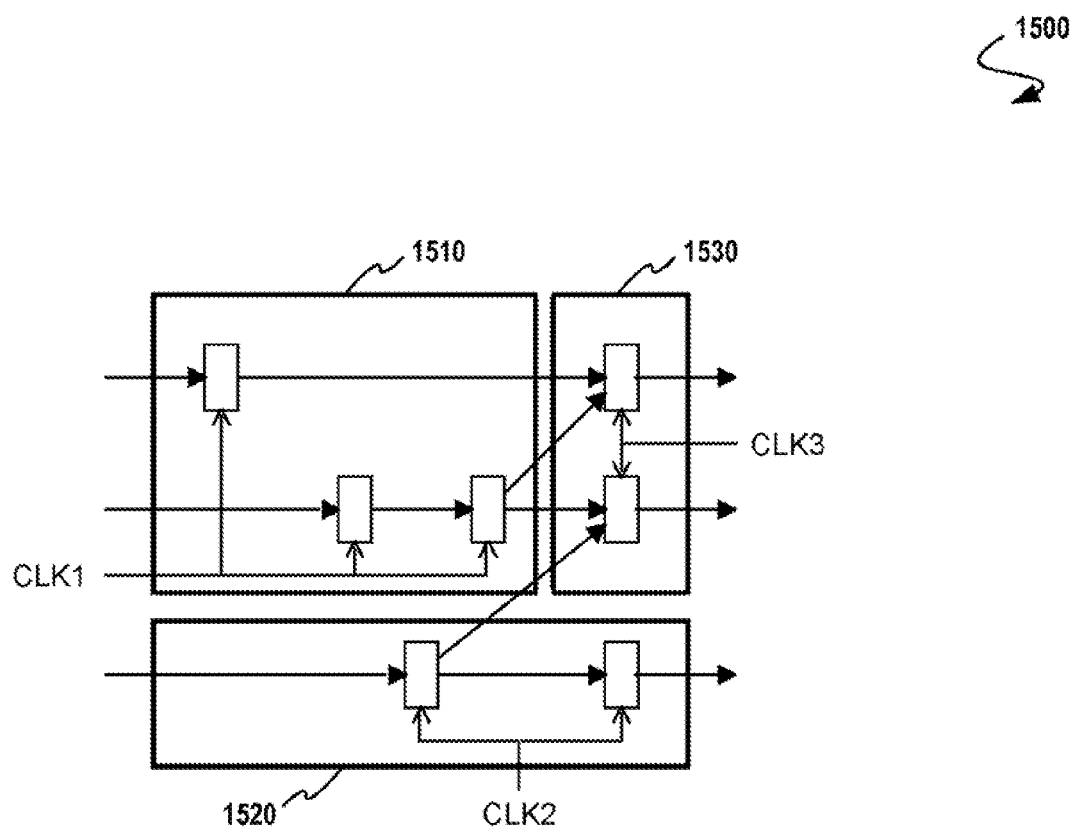
FIG. 15 is an abstract depiction of communication between multiple clock domains.

FIG. 15 is an abstract depiction of communication between multiple clock domains, according to some embodiments. As shown, the multi-domain circuit 1500 depicts the interconnection of circuits between multiple clock domains. The multi-domain circuit 1500 includes multiple clocks (e.g. CLK1, CLK2, CLK3) and multiple paths that cross different clock domains (e.g. the CLK1 clock domain 1510, the CLK2 clock domain 1520, and the CLK3 clock domain 1530). In many such situations like the multi-domain circuit 1500, special circuit structures have been used in the prior art to avoid metastability in the receiving flip-flops. These prior art structures involve latency penalties that become more and more severe as the circuits operate at higher and higher frequencies. However, if each clock domain can be de-synchronized, more efficient solutions can be implemented based on the utilization of embodiments of this invention. In the paragraphs herein we discuss possible schemes to mitigate the synchronization latency involved in CDC scenarios.

Schemes Involving Centralized Clock Separation

Figure 16:
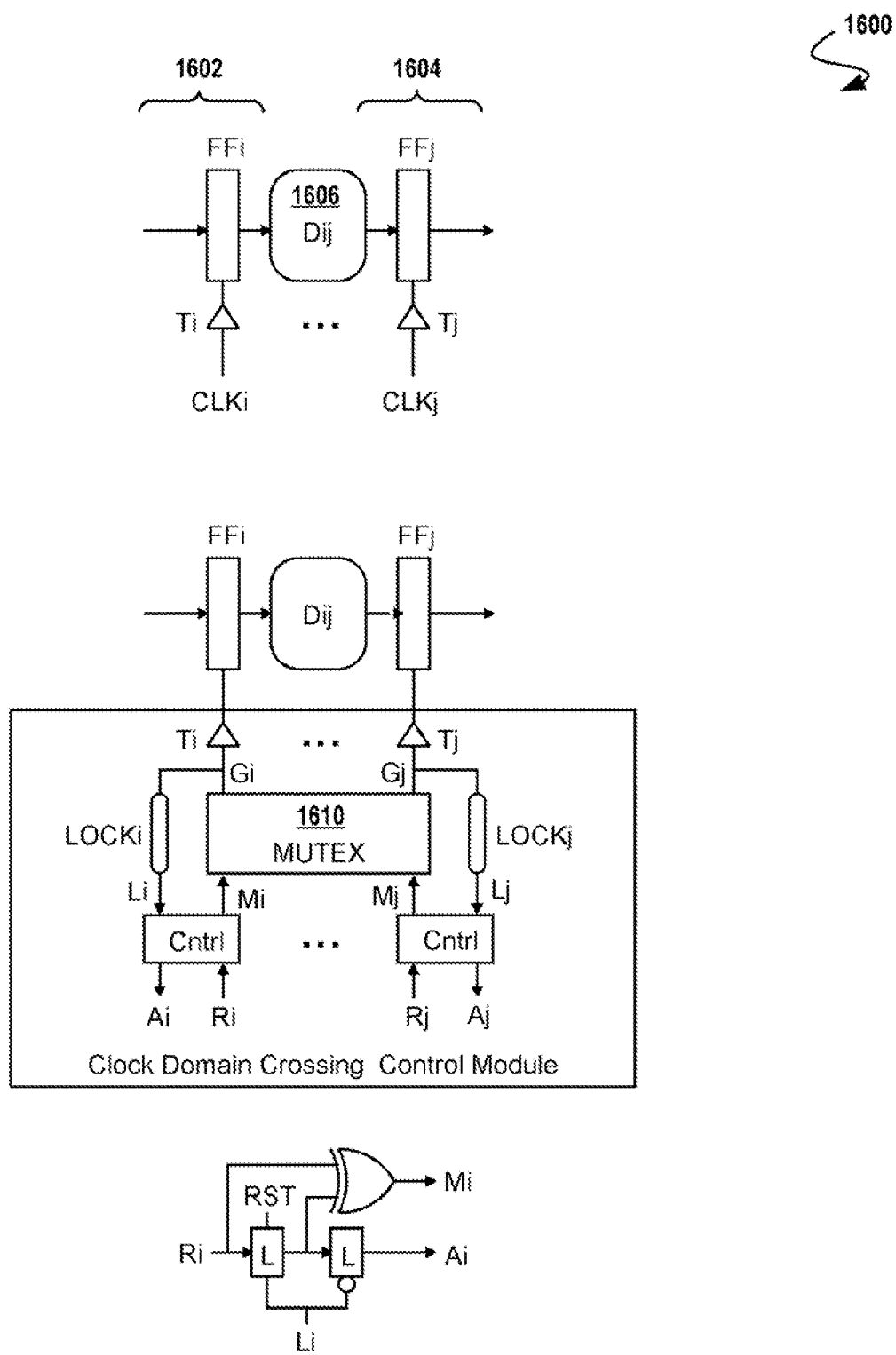
FIG. 16 shows schematics of portions of logic for implementing a scheme for elastic crossing of clock domains using centralized clock separation, according to some embodiments.

FIG. 16 shows schematics of portions of logic for implementing a scheme for elastic crossing of clock domains using centralized clock separation, according to some embodiments. As shown, elements of the sending clock domain 1602 interface to elements of the receiving clock domain 1604 through combinational logic Dij 1606. The flip-flop FFi within the sending clock domain 1602 is clocked by clock buffer Ti driving clock CLKi. The flip-flop FFj within the receiving clock domain 1604 is clocked by clock buffer Tj driving clock CLKj. Logic Dij is disposed between the two clock domains. For resolving the problems attendant to crossing clock domains, clocks CLKi and CLKj may be replaced by handshake circuits that generate asynchronous clocks for Thus, the lock delay value can be calculated observing the following timing constraint:

$$\text{lock\_delay}_{(MIN)} \geq \text{combinational\_propagation}_{(MAX)} + \text{buffer\_settling}_{(MAX)} - \text{GtoL}_{(MIN)}$$

Embodiments of this scheme may include a multi-input mutex that can be designed using tree structures.

Schemes Involving Distributed Clock Separation

Figure 17:
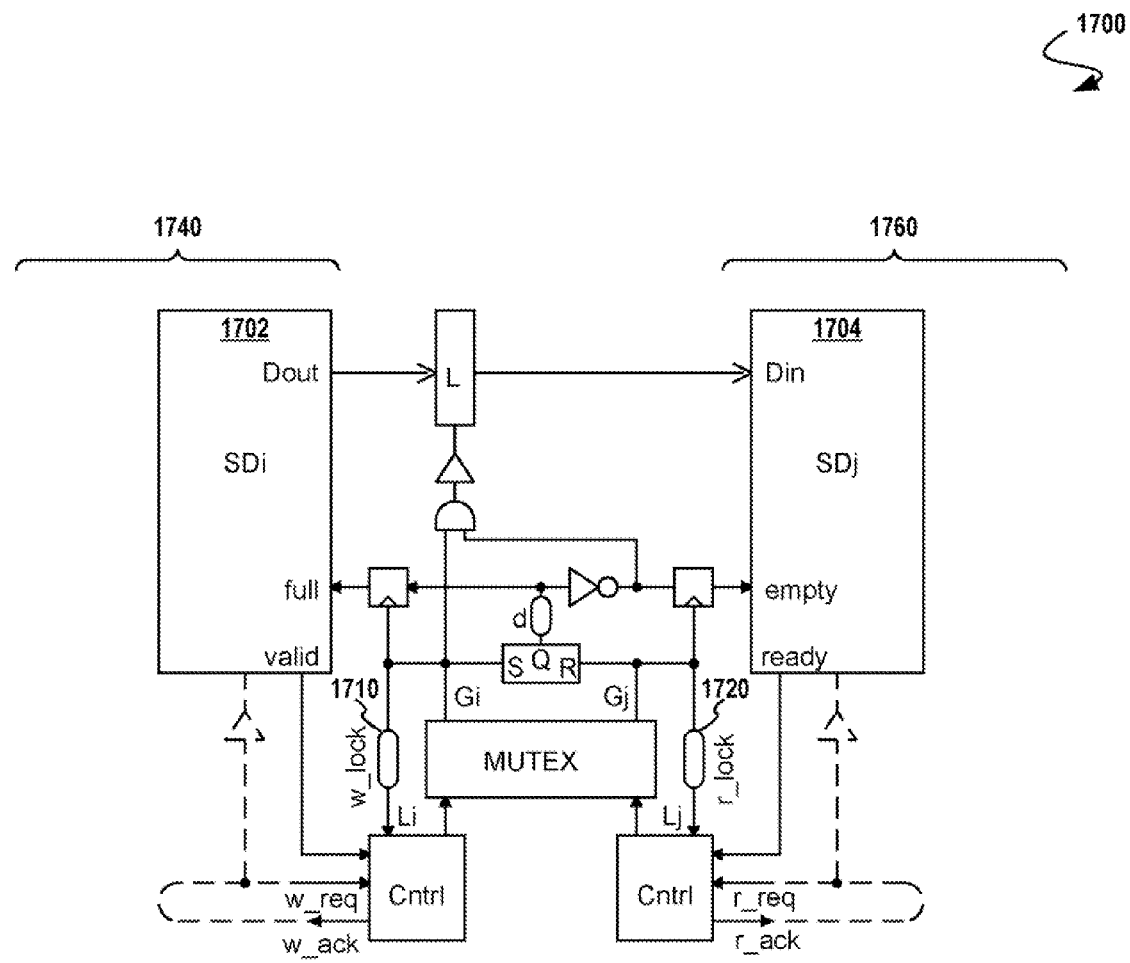
FIG. 17 is a schematic of logic for implementing a scheme for elastic crossing of clock domains using distributed deadlock-free clock separation, according to some embodiments.

Another technique for clock domain crossing involves the use of a scheme for elastic crossing of clock domains using distributed deadlock-free clock separation. FIG. 17 is a schematic of logic for implementing a scheme for elastic crossing of clock domains using distributed deadlock-free clock separation, according to some embodiments.

A distributed clock separation scheme is based on a particular case of an elastic FIFO with only one memory slot. In this particular case, no counters are required for the read and write pointers since there is only one location in the FIFO.

More specifically, and as shown in FIG. 17, the sequential device SDi 1702 is to communicate data at output Dout to the sequential device SDj 1704 at input Din, even though SDi is in a different clock domain than SDj. The technique for elastic crossing of clock domains using distributed deadlock-free clock separation makes use of sequential devices SDi and SDj wherein SDi and SDj are clocked by the one-slot FIFO control signals. Even though there is no counter and no counter increment/decrement logic (since there is only one FIFO slot) there still exists FIFO control logic for determining the full or empty state of the single FIFO slot. Accordingly, the lock delays w_lock delay element 1710 and r_lock delay element 1720 are designed according to the worst-case propagation of signals starting from the sequential elements of the corresponding clock domain.

TABLE 3

Lock Delay Calculation Scenarios for Distributed Clock Separation

| Case | Combinational Propagation Delay to nFIFO | Worst-Case Settling Time for FIFO Control Logic | Propagation Delay (e.g. from Gi to Li without considering lock delay) | Selected Lock Delay Value (minimum) |
|---|---|---|---|---|
| Fast | 2 | 5 | 1 | 6 |
| Nominal | 4 | 5 | 1 | 8 |
| Slow | 40 | 10 | 1 | 49 |

Thus, a lock delay value can be calculated according to the following timing equation:

$$\text{lock\_delay}_{(MIN)} \geq \text{combinational\_propagation}_{(MAX)} + \text{FIFO\_settling}_{(MAX)} - \text{GtoL}_{(MIN)}$$

This distributed clock separation scheme is yet another scheme suitable for an automatic clock domain crossing transformation of the classical synchronous clock schemes to an asynchronous scheme with a single-slot elastic FIFO. An example of an implementation of such a transformation scheme is found in FIG. 18.

It should be noted that the centralized clock separation scheme and the distributed clock separation scheme described above are both deadlock-free. In both cases, it can be guaranteed that none of the modules interacting with the elastic interface will ever be stopped indefinitely by the clock domain crossing logic.

Figure 18:
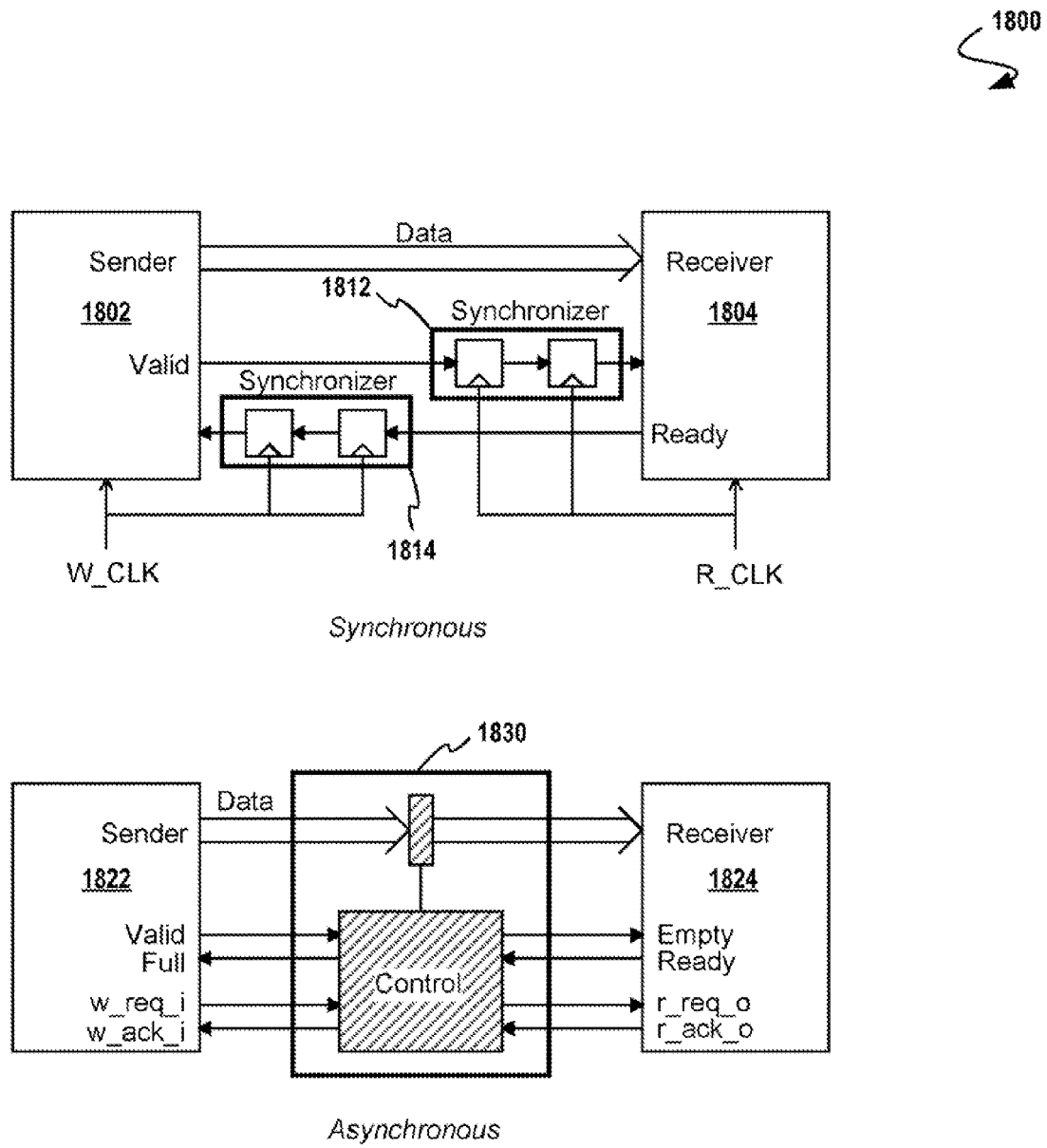
FIG. 18 shows schematics of logic for transforming a scheme for communication of data between two separate synchronous clock domains into a scheme for communication of data between two separate asynchronous clock domains using distributed deadlock-free clock separation, according to some embodiments.

FIG. 18 shows schematics of logic for transforming a scheme for communication of data between two separate synchronous clock domains into a scheme for communication of data between two separate asynchronous clock domains using distributed deadlock-free clock separation, according to some embodiments. As shown, the synchronous system sender module 1802 communicates with the synchronous system receiver module 1804 using the sender flip-flop chain 1812 and the receiver flip-flop chain 1814. Also shown is logic for transforming a scheme for communication of data between two separate asynchronous clock domains using the technique of distributed deadlock-free clock separation. The asynchronous system sender module 1822 communicates with the asynchronous system receiver module 1824 using the mutex-based single-slot elastic FIFO 1830.

Figure 19:
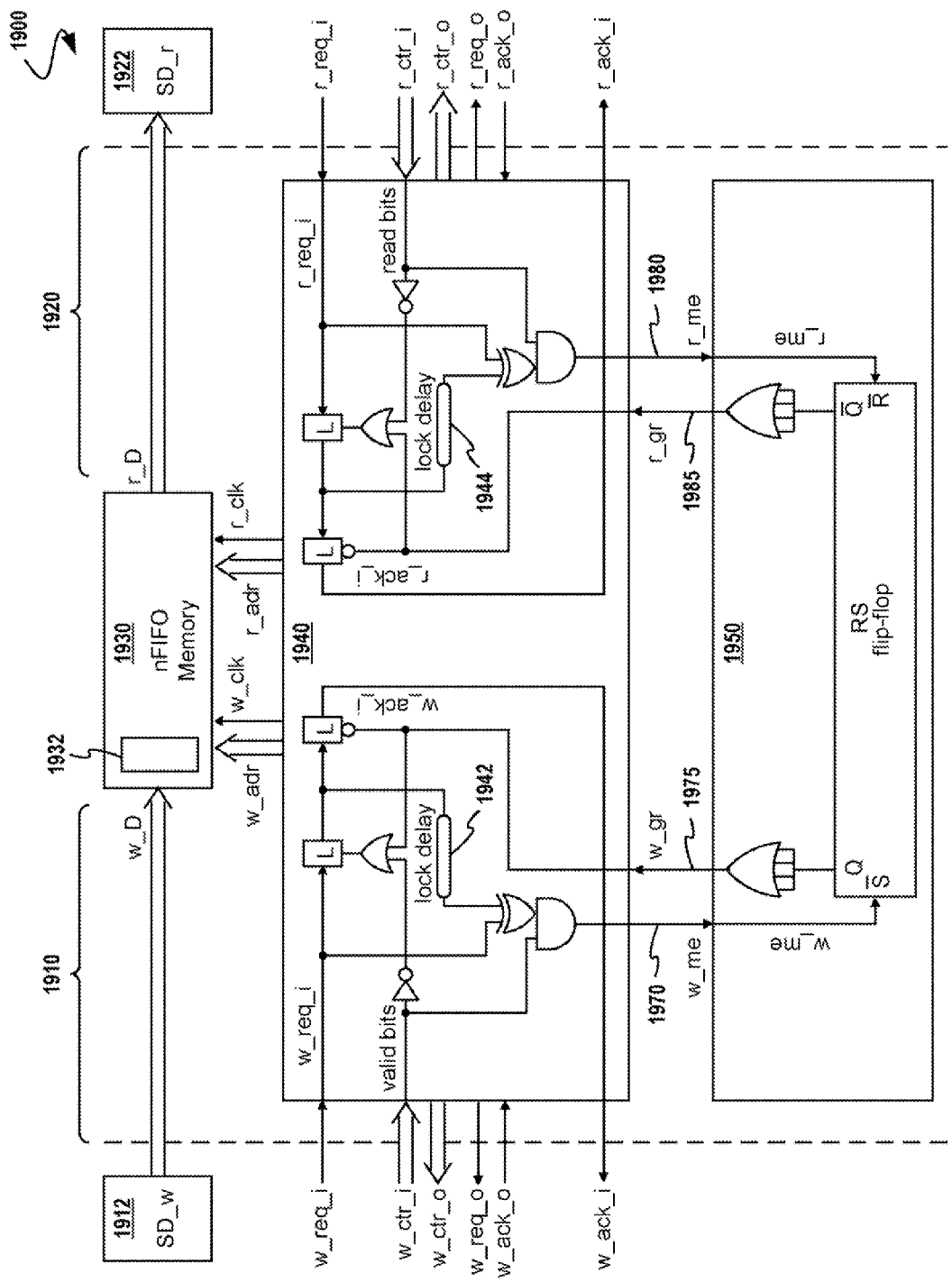
FIG. 19 depicts an elastic nFIFO used within an asynchronous scheme for clock domain crossing, according to some embodiments.

FIG. 19 depicts an elastic nFIFO used in an asynchronous scheme for clock domain crossing, according to some embodiments. The domain-crossing elastic nFIFO of system 1900 serves for managing a first data signal communication between a first clock domain 1910 and a second clock domain 1920. As shown, the domain-crossing elastic nFIFO comprises an nFIFO memory 1930 having at least one memory bit 1932. The nFIFO memory 1930 is controlled by an nFIFO control module 1940 with two lock delays (e.g. the first clock domain lock delay 1942 and the second clock domain lock delay 1944) electrically connected to the at least one memory bit 1932. The nFIFO control module 1940 communicates with an nFIFO control logic mutual exclusion circuit 1950 electrically connected to the nFIFO control module 1940, wherein the mutual exclusion circuit includes at least two mutual exclusion input signals (e.g. the write mutual exclusion request signal 1970 and the read mutual exclusion request signal 1980) and at least two mutual exclusion grant output signals (e.g. the write mutual exclusion request grant signal 1975 and the read mutual exclusion request grant signal 1985).

FIG. 19 also shows a first clock domain sequential device SD_w 1912 and a second clock domain sequential device 1922. Each of these sequential devices are operable to generate and respond to their corresponding data signals, control signals, and handshake signals. For example, the first clock domain sequential device SD_w 1912 generates data at signal w_D (e.g. the data to be communicated between clock boundaries), a request signal at w_req_i (e.g. a control signal asserted when data is requested to be communicated between clock boundaries), a control signal at w_ctr_i (e.g. a signal, possibly a multi-value signal, containing information about the data at w_D), and a handshake signal w_ack_o for the output control of the first clock domain sequential device SD_w 1912 (e.g. a handshake signal). Also, the first clock domain sequential device SD_w 1912 may receives a control at signal w_ctr_o (e.g. a signal, possibly a multi-value signal containing information about the data in the FIFO), a handshake signal at w_req_o (e.g. a control handshake signal), and a control signal at w_ack_i for control of the first clock domain sequential device SD_w 1912.

Thus, there is a network of combinational logic between the sequential device SD_w and the corresponding nFIFO control logic mutual exclusion circuit 1950 input, namely the write mutual exclusion request signal 1970. Thus, timing analysis may be performed on the aforementioned network of combinational logic so as to calculate the worst-case combinational logic propagation and combinational logic delay of any signal from a particular clock domain sequential device (e.g. SD_w 1912) to the corresponding mutual exclusion request signal (e.g. the write mutual exclusion request signal 1970). The delay value of the corresponding lock delay (e.g. the first clock domain lock delay 1942) is set to a delay value equal to or greater than the calculated worst-case combinational logic propagation delay.

In some embodiments, the apparatus as shown might be used for managing a first data signal communication (e.g. w_D) between a first clock domain and a second clock domain. The logic shown includes a memory having at least one memory bit (e.g. nFIFO 1930), a memory control module (e.g. the nFIFO control module 1940) that is electrically connected to the memory, and having a first lock delay (e.g. lock delay 1942) for controlling a read clocking operation on said memory, and a second lock delay (e.g. lock delay 1944) for controlling a write clocking operation on said memory. The logic shown also includes a single instance of a memory control logic mutual exclusion circuit (e.g. nFIFO control logic mutual exclusion circuit 1950) electrically connected to the memory control module, wherein the mutual exclusion circuit includes at least two mutual exclusion input signals (e.g. write mutual exclusion request signal 1970, read mutual exclusion request signal 1980), and at least two mutual exclusion output signals (e.g. write mutual exclusion request grant signal 1975, read mutual exclusion request grant signal 1985).

Figure 20:
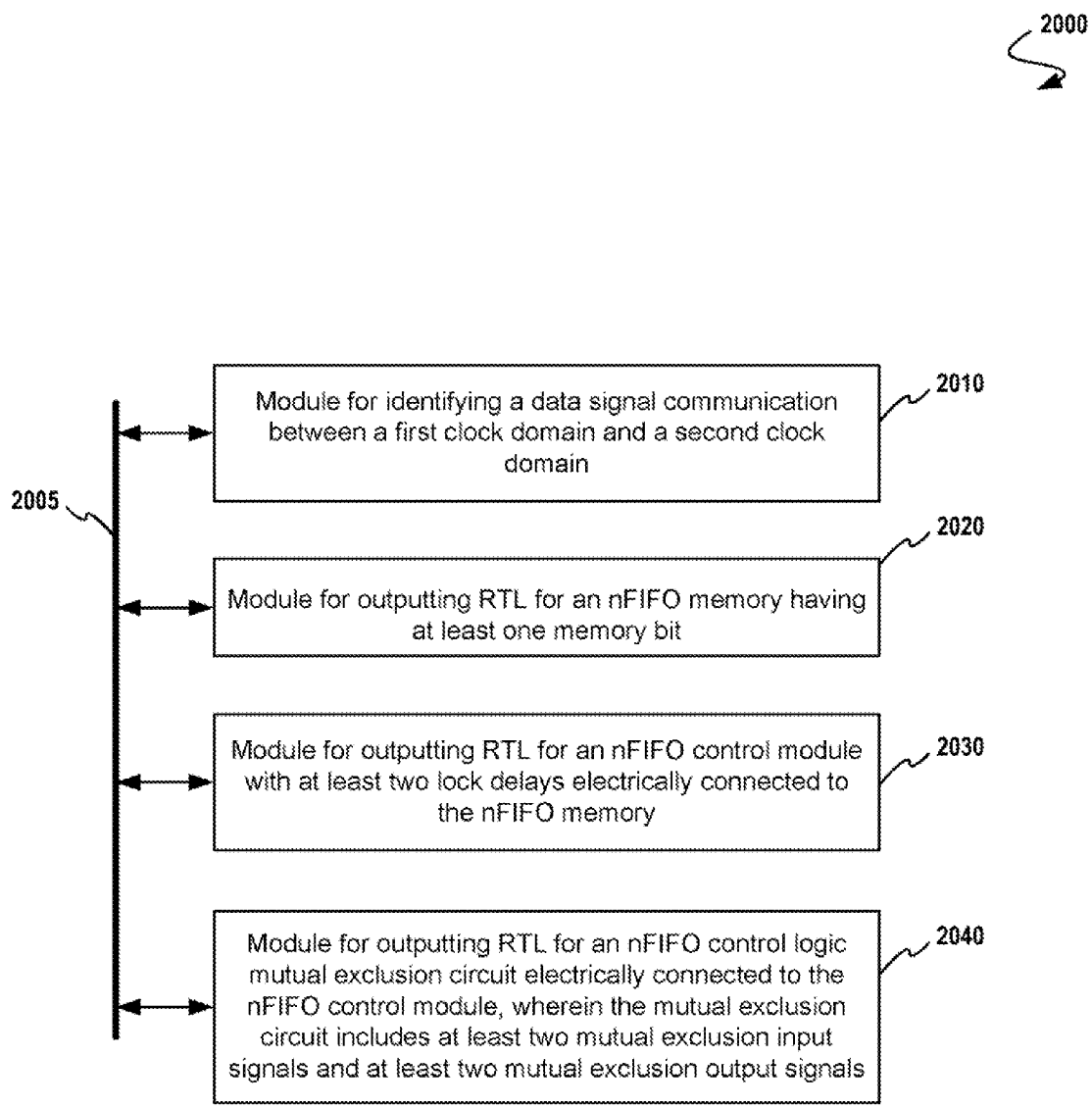
FIG. 20 depicts a method for synthesizing an apparatus for managing data signal communication between a first clock domain and a second clock domain comprising, according to some embodiments.

FIG. 20 depicts a block diagram of a system for synthesizing an apparatus for managing data signal communication between a first clock domain and a second clock domain, according to some embodiments. As an option, the present system 2000 may be implemented in the context of the architecture and functionality of FIG. 1 through FIG. 19. Of course, however, the system 2000 or any operation therein may be carried out in any desired environment. System 2000 includes a plurality of modules, each connected to a communication link 2005, and any module can communicate with other modules over the communication link 2005. The modules of the apparatus can, individually or in combination, perform method steps within system 2000.

As shown, system 2000 includes a module for identifying a data signal communication between a first clock domain and a second clock domain (see module 2010); outputting RTL for an nFIFO memory having at least one memory bit (see module 2020); outputting RTL for an nFIFO control module with at least two lock delays electrically connected to the at least one memory bit (see module 2030); and outputting RTL for an nFIFO control logic mutual exclusion circuit electrically connected to the nFIFO control module, wherein the mutual exclusion circuit includes at least two mutual exclusion input signals and at least two mutual exclusion output signals (see module 2040).

Figure 21:
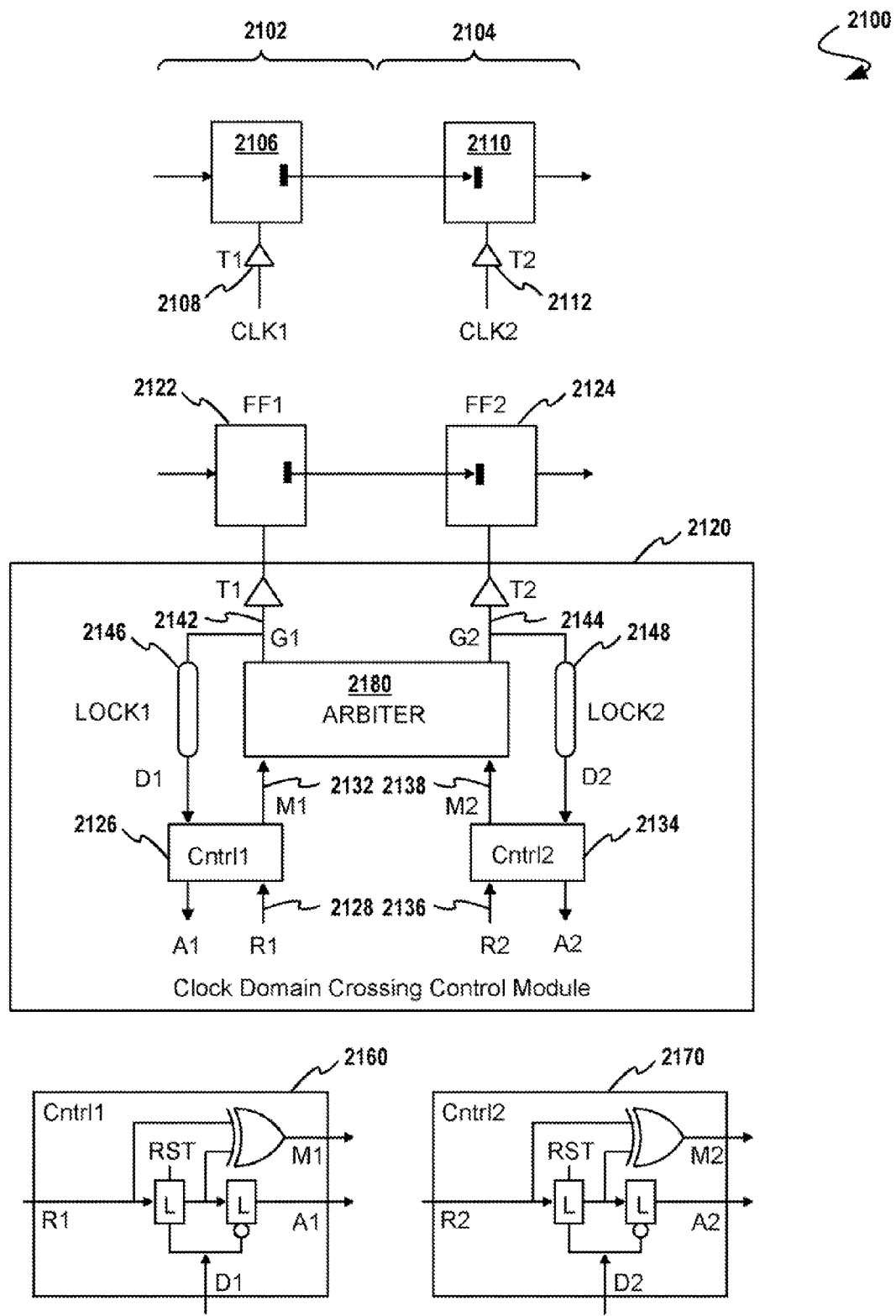
FIG. 21 depicts logic for managing data signal communication between a first clock domain and a second clock domain, according to some embodiments.

Generalized Scheme for Managing Data Signal Communication Between a First Clock Domain and a Second Clock Domain FIG. 21 depicts logic for managing data signal communication between a first clock domain and a second clock domain, according to some embodiments. As an option, the present system 2100 may be implemented in the context of the architecture and functionality of FIG. 1 through FIG. 20. Of course, however, the system 2100 or any elements or operations depicted therein may be carried out in any desired environment.

As shown, sending clock domain 2102 comprises a flip-flop 2106 clocked by a clocking signal 2108. The sending clock domain 2102 is crossed into receiving clock domain 2104, which comprises a flip-flop 2110 clocked by a clocking signal 2112. In the special case that the clocking events of clocking signal 2108 are simultaneous with the clocking events of clocking signal 2112, the sending clock domain 2102 may be crossed into the receiving clock domain 2104 without the generalized handshaking logic 2120. However, when the clocking events of clock 2108 are not simultaneous with the clocking events of clocking signal 2112, by design (e.g. for crossing between two independently controlled systems) or by effect of uncorrelated variations of circuit delays within the aforementioned clock domains (e.g. clock domain 1202, clock domain 2104), some technique must be employed for reliably crossing between the clock domains.

As earlier discussed, one technique for reliably crossing between the clock domains is to use asynchronous FIFOs. Another technique is to use a handshake protocol for coordinating respective valid and ack signals between the sending flip-flop and the receiving flip-flop. The generalized handshaking logic 2120 implements a low-latency scheme for transforming synchronous clocks into asynchronous (e.g. pausible, stoppable) clocks.

The generalized handshaking logic 2120, when implemented within a scheme for reliable clock domain crossing using asynchronous clocks includes control circuit logic (e.g. two or more control circuits) for relating request and acknowledge signals (e.g. R1, A1) and within a time window controlled by a lock delay element (e.g. LOCK1). More particularly, the assertion of the acknowledge signals A1 of the control circuit cntrl1 and A2 of the control circuit cntrl2, forms the basis for controlling the stoppable clocks (e.g. first clocking signal 2142, second clocking signal 2144). That is, given a first request, no second request (e.g. from request signals R1 or R2) will be processed until after the acknowledge signal corresponding to the first signal is asserted.

A possible realization of the control logic elements, specifically element cntrl1, and element cntrl2 are shown as logic block 2160 and logic block 2170, respectively. The input signal R1 indicates new data is available to be sent. The input signal D1 guarantees a period of separation between clocking events. The output signal A1 is the acknowledge signal used in handshaking. The lock delays guarantee separation for the edges of input signal D1. As may be readily understood by those skilled in the art, the generalized handshaking logic 2120 manages timing of clock events to FF1 and FF2 such that (1) the clocking event for receiving element FF2 does not arrive before new data is available and stabilized in sending sequential element FF1, and that the clock edge of sending sequential element FF2 does not send new data that can overwrite the previous data while the previous data is being latched into receiving sequential element FF2. Techniques for selecting a lock delay (e.g. LOCK1, LOCK2) are presented infra.

In another embodiment, an apparatus for clock domain crossing between a first sequential element 2122 in a first clock domain 2102 and a second sequential element 2124 in a second clock domain 2104 may be realized using an apparatus as shown as generalized handshaking logic 2120 comprising a first control logic element 2126 for processing a first asynchronous handshake signal 2128 and producing a first arbiter input signal 2132 (which arbiter might be implemented using a mutex) and also operating in conjunction with a second control logic element 2134 for processing a second asynchronous handshake signal 2136 and producing a second arbiter input signal 2138. The first control logic element 2126 and the second control logic element 2134 interfaces with the arbiter 2180 via the first arbiter input signal 2132 and the second arbiter input signal 2138. Note that exactly one arbiter element is present, inputting the first arbiter input signal 2132, inputting the second arbiter input signal 2138, and outputting a first clocking signal 2142 to the first sequential element 2122, and also outputting a second clocking signal 2144 to the second sequential element 2124. Connected to the first clocking signal 2142 and connected to first control logic element 2126 is a first controllable lock delay element 2146 wherein a first delay value for the first controllable lock delay element 2146 is selected to satisfy the setup constraint of the second sequential element 2124. Connected to the second clocking signal 2144, and connected to the second control logic element 2134 is a second controllable lock delay element 2148 wherein a second delay value for the second controllable lock delay element is selected to satisfy the hold constraint of the second sequential element.

As is readily understood from the foregoing, the generalized handshaking logic 2120 serves for clock domain crossing between a first clock domain 2102 and a second clock domain 2104 even where the first clock domain periodicity is not an even multiple of the second clock domain periodicity. Moreover, using the generalized handshaking logic 2120 in embodiments of the present invention, the first clock domain may be clocked using a first aperiodic clock signal and the second clock domain may be clocked using a second aperiodic clock signal, yet, the controllable lock delay element 2146 and the controllable lock delay element 2148 are controlled such that the setup and hold constraints of the second sequential element 2124 are observed. Still more, the first control logic element 2126 participates in preventing a new data item from being presented to be clocked into the second sequential element 2124 before the second sequential element 2124 has clocked in the previous, stabilized data item. Of course, within the scope of the art of circuit design, the aforementioned term "controlled" may mean that the circuit operates to control the delay dynamically. For example a controlled delay might be formed by using a multiplexor with several selectable delays in conjunction with control logic that selects the most appropriate delay dynamically. Still within in the scope of the art of circuit design, the term "controlled" may mean that the controlled delay is calculated, synthesized, defined, built-in or designed-in to be a delay of a particular value.

Figure 22:
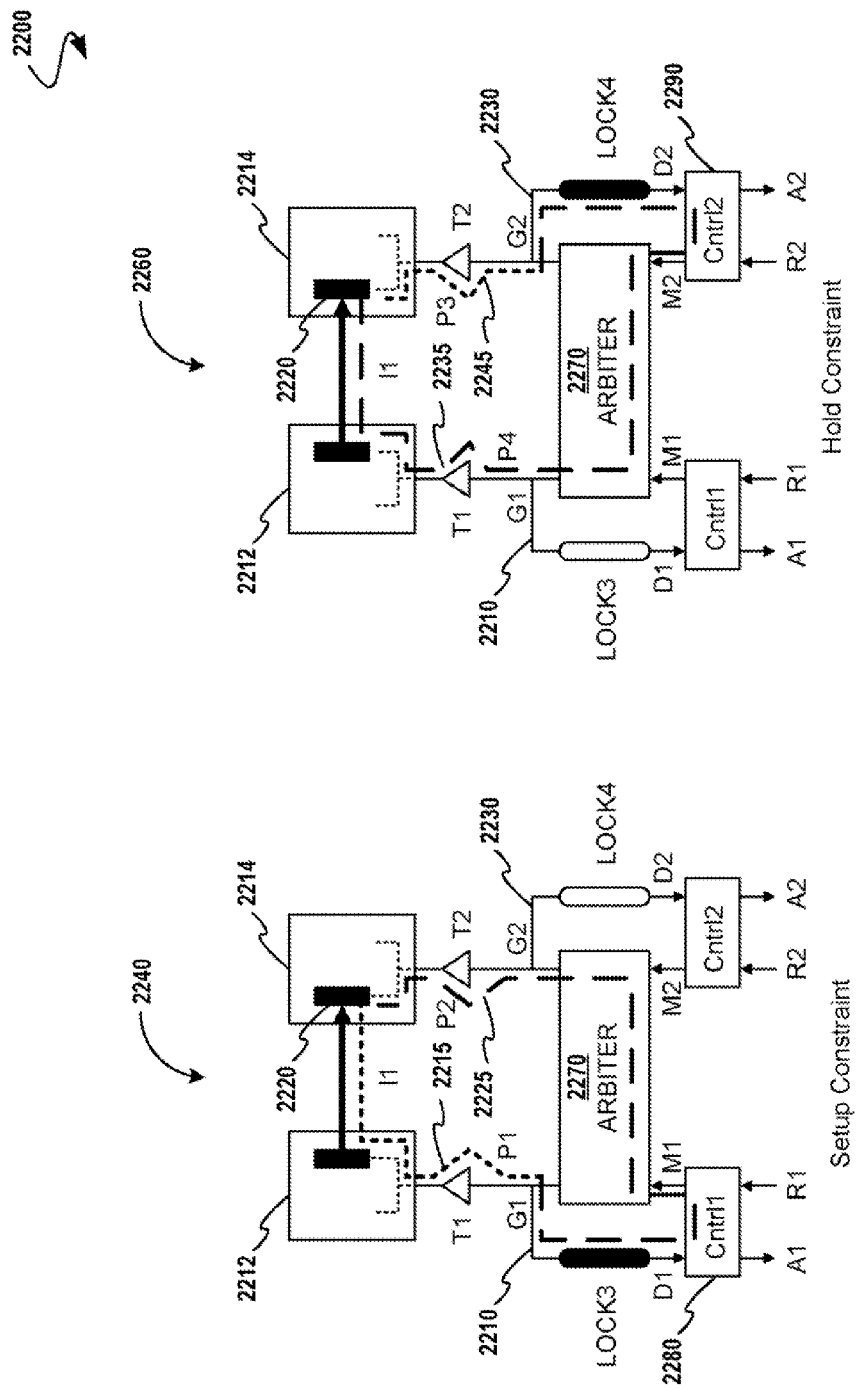
FIG. 22 depicts a transformation of a synchronous clock system for synthesizing an apparatus for managing data signal communication between a first clock domain and a second clock domain using lock delay elements, according to some embodiments.

FIG. 22 depicts a transformation of a synchronous clock system for synthesizing an apparatus for managing data signal communication between a first clock domain and a second clock domain using lock delay elements, according to some embodiments. As an option, the present system 2200 may be implemented in the context of the architecture and functionality of FIG. 1 through FIG. 21. Of course, however, the system 2200 or any elements or operations depicted therein may be carried out in any desired environment.

FIG. 22 illustrates the setup and hold constraints that determine the values of the LOCK delays (e.g. LOCK3 and LOCK4). For each constraint (i.e. the setup constraint, the hold constraint), there are two paths, one path depicted as a dotted path, and another path depicted as a dashed path, where each path starts at the same point and each path terminates at the same point, though traversing different paths. For example, and as shown a setup constraint path depiction 2240 includes a dotted path originating at point G1 2210 and terminating at data input point 2220 through T1. The depiction of the paths involved in the setup constraint path depiction 2240 includes a dashed path originating at point G1 2210, terminating at data input point 2220, and passing through LOCK3.

The dotted path shown as path P1 2215 includes all active and passive elements along the dotted path, namely G1, media, clock tree elements in and around T1, flip-flop logic in and around the sending flip-flop 2212, and media (e.g. metal, polysilicon, insulators, vias, or other media capable of carrying electrical current or holding electrical charge) up to and including the data input point 2220 of the receiving flip-flop 2214. The paths involved in the setup constraint path depiction 2240 also includes a dashed path, shown as originating at point G1 2210 and terminating at data input point 2220 through LOCK3. The dashed path shown as path P2 2225 includes all active and passive elements along the dashed path, namely G1, media up to and around LOCK3, subpaths through cntrl1 2280 from cntrl1 input D1 to cntrl1 output M1, paths through the MUTEX 2270, propagation delays in and around clock tree T2, and media up to and including the data input point 2220 of the receiving flip-flop 2214.

The propagation delay of a signal through the dotted path, path P1 2215, must be shorter than the propagation delay through dashed path, path P2 2225. To control this relationship, the LOCK3 delay may be defined to ensure that the propagation delay through path P2 will always be longer than the propagation delay through path P1.

In a more formal notation:

$LOCK_e$=(propagation delay through path $P2$)−(propagation delay through path $P1$)

if($LOCK_e>0$) then LOCK=0

That is, the value of a lock delay LOCK can be arithmetically determined by calculating the value $LOCK_e$ as the difference between the signal propagation delay through path P1 as compared to the signal propagation delay through path P2. If $LOCK_e$ is less than zero, then LOCK is set to $LOCK_e$.

Following the example, and as shown at hold constraint path depiction 2260, the depiction of the paths involved includes a dotted path originating at point G2 2230 and terminating at data input point 2220 through T2. The depiction of the paths involved in the hold constraint path depiction 2260 also includes a dashed path originating at point G2 2230 and terminating at data input point 2220 through LOCK4.

The dotted path shown as path P3 2245 includes all active and passive elements along the dashed path, namely G2, media, clock tree elements in and around T2, flip-flop logic in and around the receiving flip-flop 2214, and media up to and including the data input point 2220 of the receiving flip-flop 2214. The paths involved in hold constraint path depiction 2260 also include a dashed path originating at point G2 2230 and terminating at data input point 2220 through LOCK4. The dashed path shown as path P4 2235 includes all active and passive elements along the dashed path, namely G2, media, LOCK4, subpaths through cntrl2 2290 from cntrl2 input D2 to cntrl2 output M2, paths through the MUTEX 2270, propagation delays in and around clock tree T1, logic through sending flip-flop 2212, and media up to and including the data input point 2220 of the receiving flip-flop 2214.

The propagation delay of a signal through the dotted path, path P3 2245, must be shorter than the propagation delay through the dashed path, path P4 2235. To control this relationship, the LOCK4 delay may be defined to ensure that the propagation delay through path P4 will always be longer than propagation delay through path P3. That is, the paths involved in the hold constraint may be controlled in order to guarantee that the next data coming from the sending flip-flop does not overwrite previous data at the receiving flip-flop.

Figure 23:
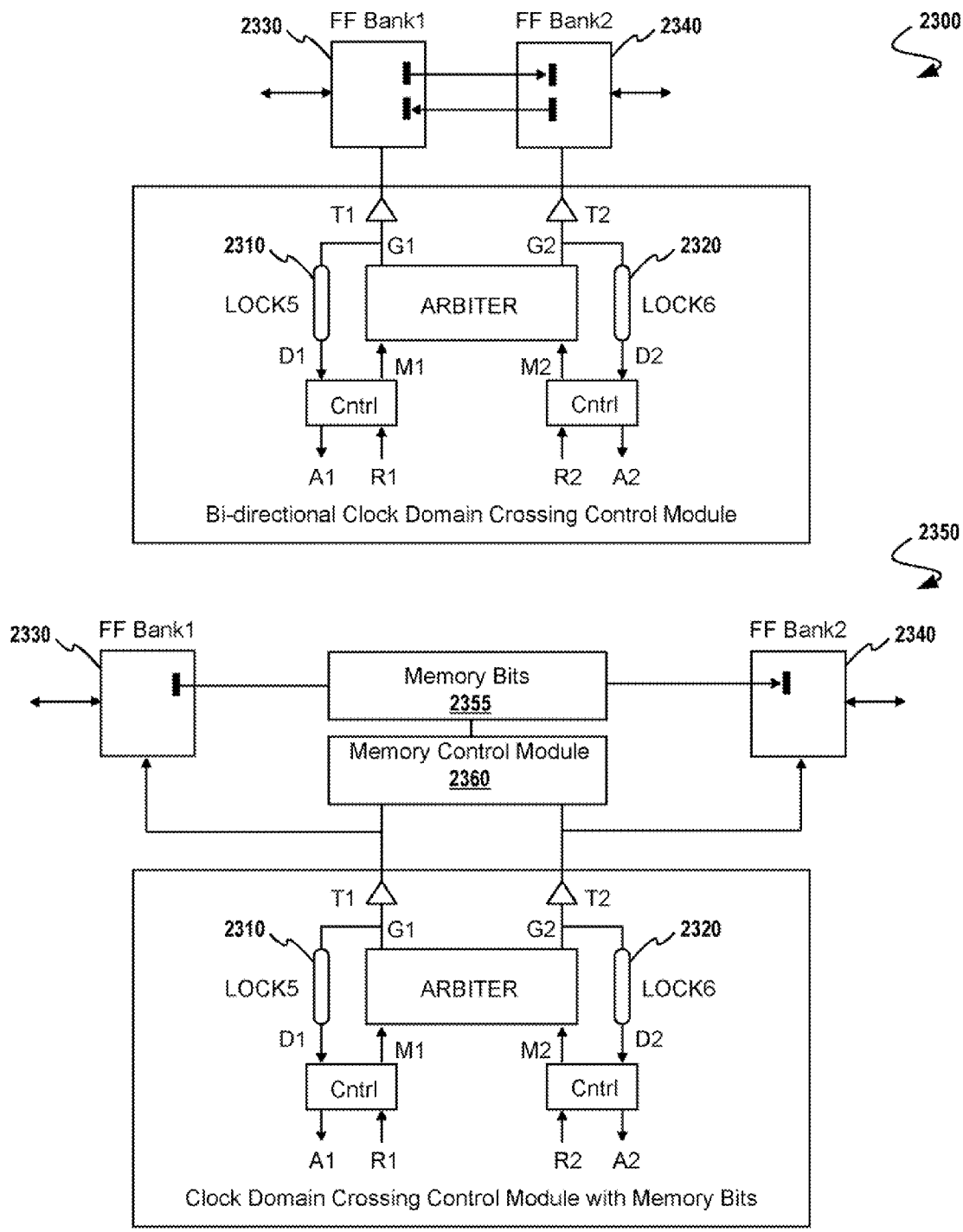
FIG. 23 depicts block diagrams of logic for managing data signal communication between a first clock domain and a second clock domain using data transfer between clock domains, according to some embodiments.

FIG. 23 depicts block diagrams of logic for managing data signal communication between a first clock domain and a second clock domain using data transfer between clock domains, according to some embodiments. As an option, the present system 2300 may be implemented in the context of the architecture and functionality of FIG. 1 through FIG. 22. Of course, however, the system 2300 or any elements or operations depicted therein may be carried out in any desired environment.

In the embodiment of system 2300 involving bidirectional transfers, the delay values selected for LOCK5 2310 and LOCK6 2320 are selected to satisfy both the setup constraints as well as satisfy the hold constraints.

When the left clock domain element (e.g. FF Bank1 2330) sends data to the right clock domain element (e.g. FF Bank2 2340), LOCK5 2310 must be controlled to satisfy the setup constraint for FF Bank2 2340. When the left clock domain element (e.g. FF Bank1 2330) sends data to the right clock domain element (e.g. FF Bank2 2340), LOCK6 2320 must be controlled to satisfy the hold constraint for FF Bank2 2340.

Conversely, When the right clock domain element (e.g. FF Bank2 2340) sends data to the left clock domain element (e.g. FF Bank1 2330), LOCK6 2320 must be controlled to satisfy the setup constraint for FF Bank1 2330. When the right clock domain element (e.g. FF Bank2 2340) sends data to the left clock domain element (e.g. FF Bank1 2330), LOCK5 2310 must be controlled to satisfy the hold constraint for FF Bank1 2330.

In one embodiment, the LOCK5 delay is selected to be the larger of the two values, namely the value selected to satisfy the setup constraint when sending from left to right and the value selected to satisfy the hold constraint when sending from right to left. In another embodiment, the LOCK6 delay is selected to be the larger of the two values, namely the value selected to satisfy the setup constraint when sending from right to left and the value selected to satisfy the hold constraint when sending from left to right.

In the embodiment of system 2350 involving at least one memory bit 2355 and a memory control module 2360, the delay values selected for LOCK5 2310 and LOCK6 2320 are selected to satisfy both the setup constraints as well as satisfy the hold constraints.

Figure 24:
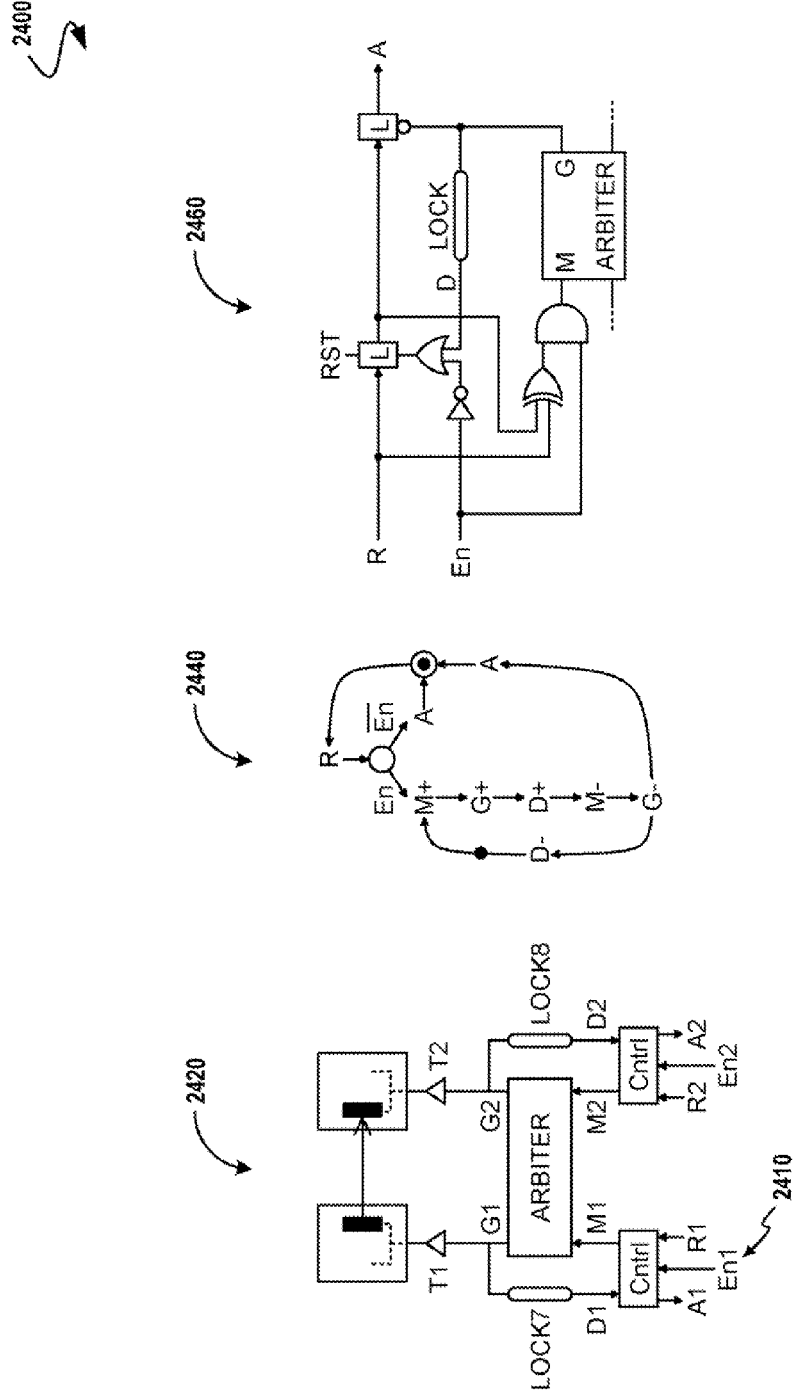
FIG. 24 depicts a system used within an asynchronous scheme for clock domain crossing including an enable signal, according to some embodiments.

FIG. 24 depicts a system 2400 used within an asynchronous scheme for clock domain crossing including an enable signal, according to some embodiments. As an option, the present system 2100 may be implemented in the context of the architecture and functionality of FIG. 1 through FIG. 23. Of course, however, the system 2400 or any elements or operations depicted therein may be carried out in any desired environment.

As shown, FIG. 24 depicts a system 2420 including a control circuit with an enable signal at 2410 that determines when the logic controlled by the control circuit should be operational. This enable signal (En) may be used in many different scenarios. For example, when the logic controlled by the control circuit is in "sleep" mode, the enable signal (En) is deasserted. As another example, when the logic controlled by the control circuit has no valid data to transfer to any receiving logic, the enable signal (En) is also deasserted. FIG. 24 also depicts an STG describing control circuit behavior 2440, which control circuit includes an enable signal input.

FIG. 24 also depicts a possible control circuit implementation 2460 including a control circuit with an enable signal input (i.e. En). In this implementation, the enable signal must be stable when the request signal (i.e. R) arrives, and the enable signal can only change after the acknowledgment occurs (e.g. an acknowledgment event on signal A)

Implementation Options

The asynchronous scheme for clock domain crossing can be generalized for any type of sequential element (e.g. flip-flop, latch, etc) to be used at the sending and receiving blocks. It can also be generalized to work for sequential elements that are triggered by rising edges or those that are triggered by falling edges. In the case of latches, it can be generalized for latches being transparent with either the high level or the low level of the clock signal. The foregoing implementations have been described using the terminology of a 2-phase protocol for the handshake signals. However, the previous techniques can be extended to circuits that behave within 4-phase protocols. Moreover, the circuits, methods and systems described herein may be implemented in either hardware or software or any combination of hardware and software.

As pertains to the hardware implementation, any circuit might be embodied in a hardware model (e.g. RTL, Verilog, VHDL, etc); or in/on a silicon substrate (e.g. within a semiconductor die or dies); or within a semiconductor package; or on a printed circuit board; or in, on, within, or as part of any electronic system (e.g. a motherboard, or backplane, or chassis or rack).

As pertains to the software implementation, embodiments of the invention comprise software that includes a plurality of computer executable instructions for implementation on a computer system with or without acceleration. Prior to loading into a general-purpose computer system, the software may reside as encoded information on a computer readable medium such as a magnetic floppy disk, magnetic tape, and/or compact disc read only memory (CD-ROM). In one hardware implementation, the invention may comprise a dedicated processor including processor instructions for performing the functions described herein. Circuits may also be developed to perform or accelerate the functions described herein. In some embodiments, circuits and systems described herein may be implemented in a collection of components or modules.

Figure 25:
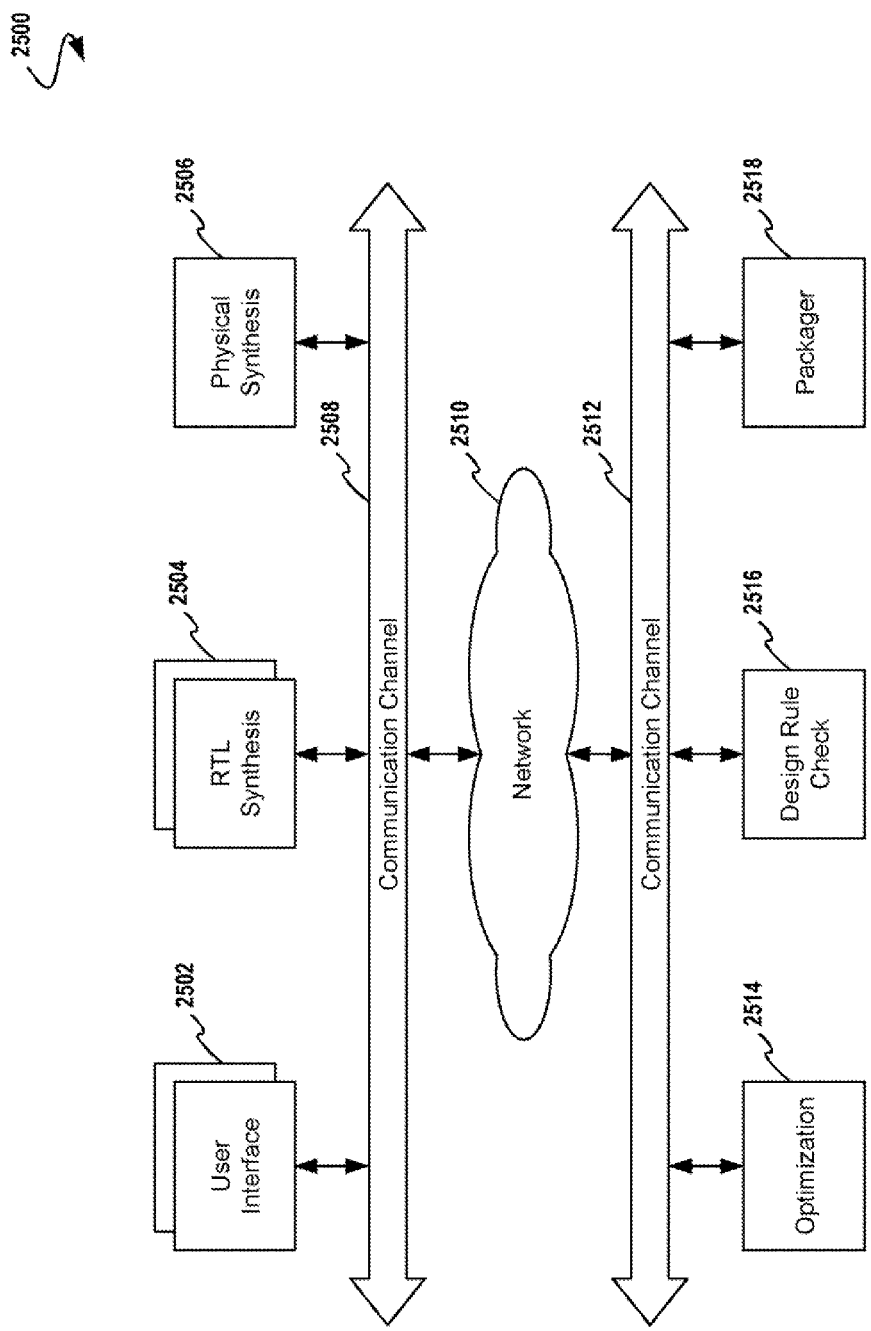
FIG. 25 is an illustration of an environment in which the methods described herein might be practiced, according to one embodiment.

FIG. 25 is an illustration of an environment in which the methods described herein might be practiced, according to one embodiment. As shown, a user interface component 2502, an RTL synthesis component 2504, and a physical synthesis component 2506 are all in communication, one with another, via a first communication channel 2508. Similarly, the optimization component 2514, the design rule check component 2516, and the packager component 2518 are in communication via a second communication channel 2512, as shown. In some embodiments, there may be optionally a network cloud 2510 for communication between the first communication channel 2508 and the second communication channel 2512, possibly through any number of subnetworks (which themselves may contain subnetworks) within the cloud 2510. Also, in some embodiments, the first communication channel 2508 may be the same, or otherwise indistinguishable, from the second communication channel 2512. Within the flexibility of such possible mappings, one skilled in the art can readily see that the user interface component 2502 might be adapted to be operable on a laptop computer in communication with, for example, the design rule check component 2516, with such communication taking place over the network. In exemplary embodiments, there may be more than one instance of a user interface component 2502, and in some embodiments, a given instance of a user interface component 2502 may share some or no similarities to a second or nth user interface component 2502; in fact, a user interface component might have a one-to-one correspondence to any component (or subcomponent) present in the system 2500.

In some embodiments, circuits and systems described herein may be implemented in whole or in part in a client-server arrangement. In fact, the aforementioned components for carrying out the methods or for producing the circuits disclosed here (e.g. 2502, 2504, 2506, 2514, 2516, and 2518) might be implemented in one or more software modules.

Figure 26:
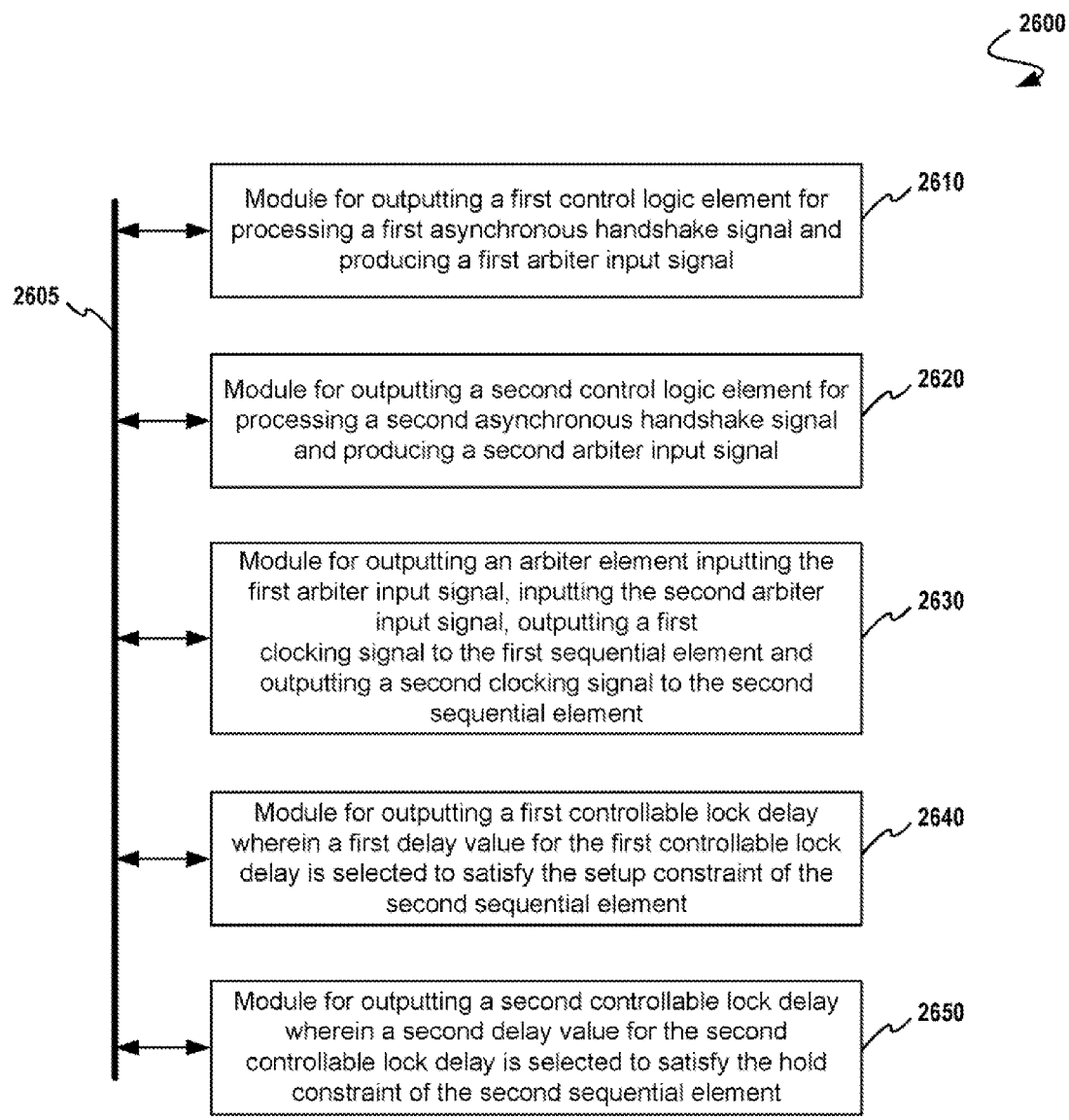
FIG. 26 depicts a block diagram of a system for clock domain crossing between a first sequential element in a first clock domain and a second sequential element in a second clock domain, according to one embodiment.

FIG. 26 depicts a block diagram of a system for clock domain crossing between a first sequential element in a first clock domain and a second sequential element in a second clock domain. As an option, the present system 2600 may be implemented in the context of the architecture and functionality of the embodiments described herein. Of course, however, the system 2600 or any operation therein may be carried out in any desired environment. The embodiment shown is exemplary for environments with stoppable clocks that synchronize with handshakes. System 2600 includes a plurality of modules, each connected to a communication link 2605, and any module can communicate with other modules over communication link 2605. The modules of the system can, individually or in combination, perform method steps within system 2600. Any method steps performed within system 2600 may be performed in any order unless as may be specified in the claims. As shown, system 2600 implements a method for clock domain crossing between a first sequential element in a first clock domain and a second sequential element in a second clock domain, the system 2600 comprising modules for: outputting a first control logic element for processing a first asynchronous handshake signal and producing a first mutex input signal (see module 2610); outputting a second control logic element for processing a second asynchronous handshake signal and producing a second mutex input signal (see module 2620); outputting a mutex element inputting the first mutex input signal, inputting the second mutex input signal, outputting a first clocking signal to the first sequential element and outputting a second clocking signal to the second sequential element (see module 2630); outputting a first controllable lock delay wherein a first delay value for the first controllable lock delay is selected to satisfy the setup constraint of the second sequential element (see module 2640); and outputting a second controllable lock delay wherein a second delay value for the second controllable lock delay is selected to satisfy the hold constraint of the second sequential element (see module 2650). Some embodiments output exactly one mutex element (see module 2630).

Figure 27:
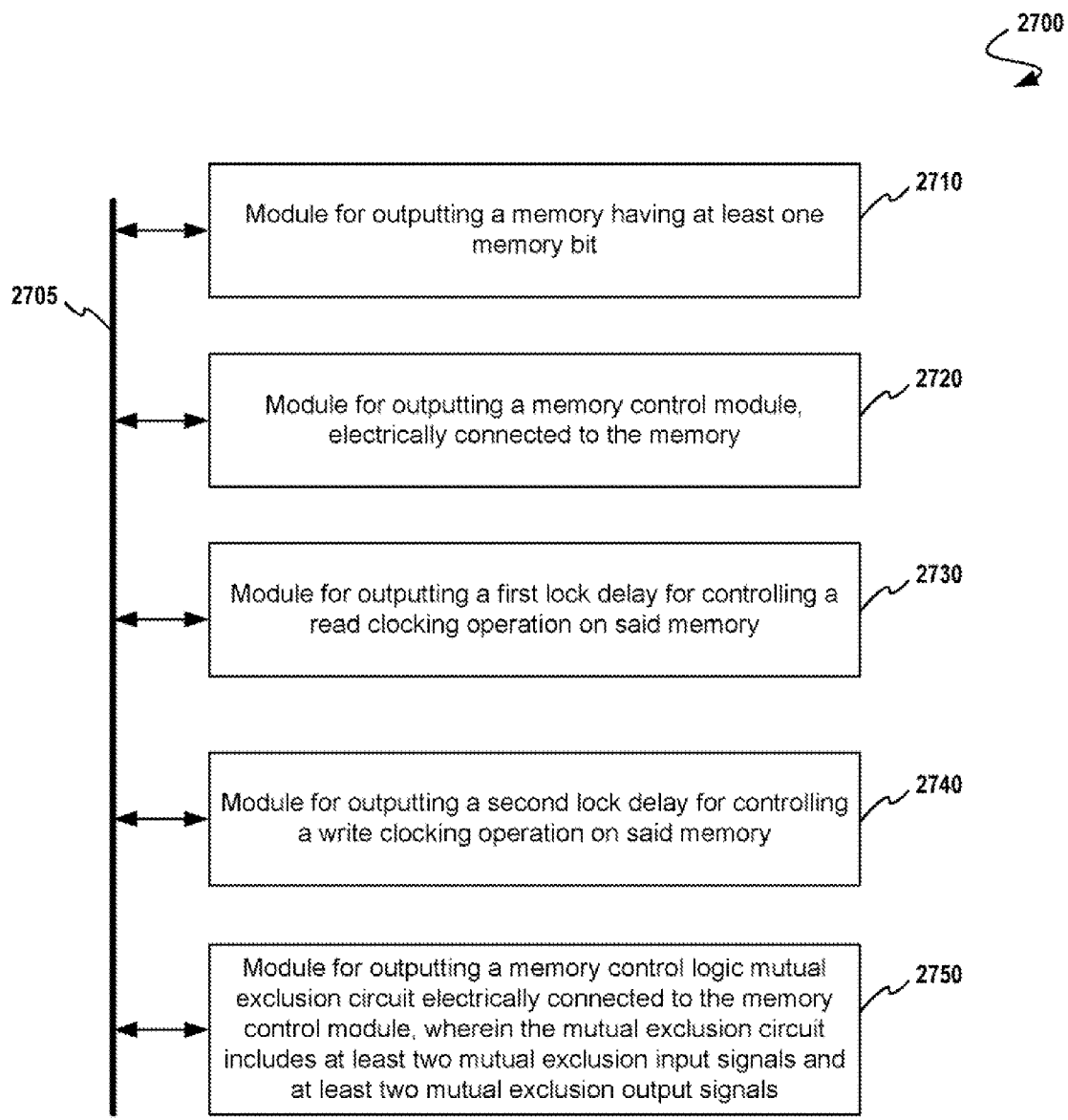
FIG. 27 depicts a block diagram of a system for managing a first data signal communication between a first clock domain and a second clock domain, according to one embodiment.

FIG. 27 depicts a block diagram of a system for managing a first data signal communication between a first clock domain and a second clock domain. As an option, the present system 2700 may be implemented in the context of the architecture and functionality of the embodiments described herein. Of course, however, the system 2700 or any operation therein may be carried out in any desired environment. As shown, system 2700 includes a plurality of modules, each connected to a communication link 2705, and any module can communicate with other modules over communication link 2705. The modules of the system can, individually or in combination, perform method steps within system 2700. Any method steps performed within system 2700 may be performed in any order unless as may be specified in the claims. As shown, system 2700 implements a method for managing a first data signal communication between a first clock domain and a second clock domain, the system 2700 comprising modules for: outputting a memory having at least one memory bit (see module 2710); outputting a memory control module, electrically connected to the memory (see module 2720); outputting a first lock delay for controlling a read clocking operation on the memory (see operation 2730); outputting a second lock delay for controlling a write clocking operation on the memory (see module 2740); and outputting a memory control logic mutual exclusion circuit electrically connected to the memory control module, wherein the mutual exclusion circuit includes at least two mutual exclusion input signals and at least two mutual exclusion output signals (see module 2750). Some embodiments output only a single memory control logic mutual exclusion circuit electrically connected to the memory control module.

Figure 28:
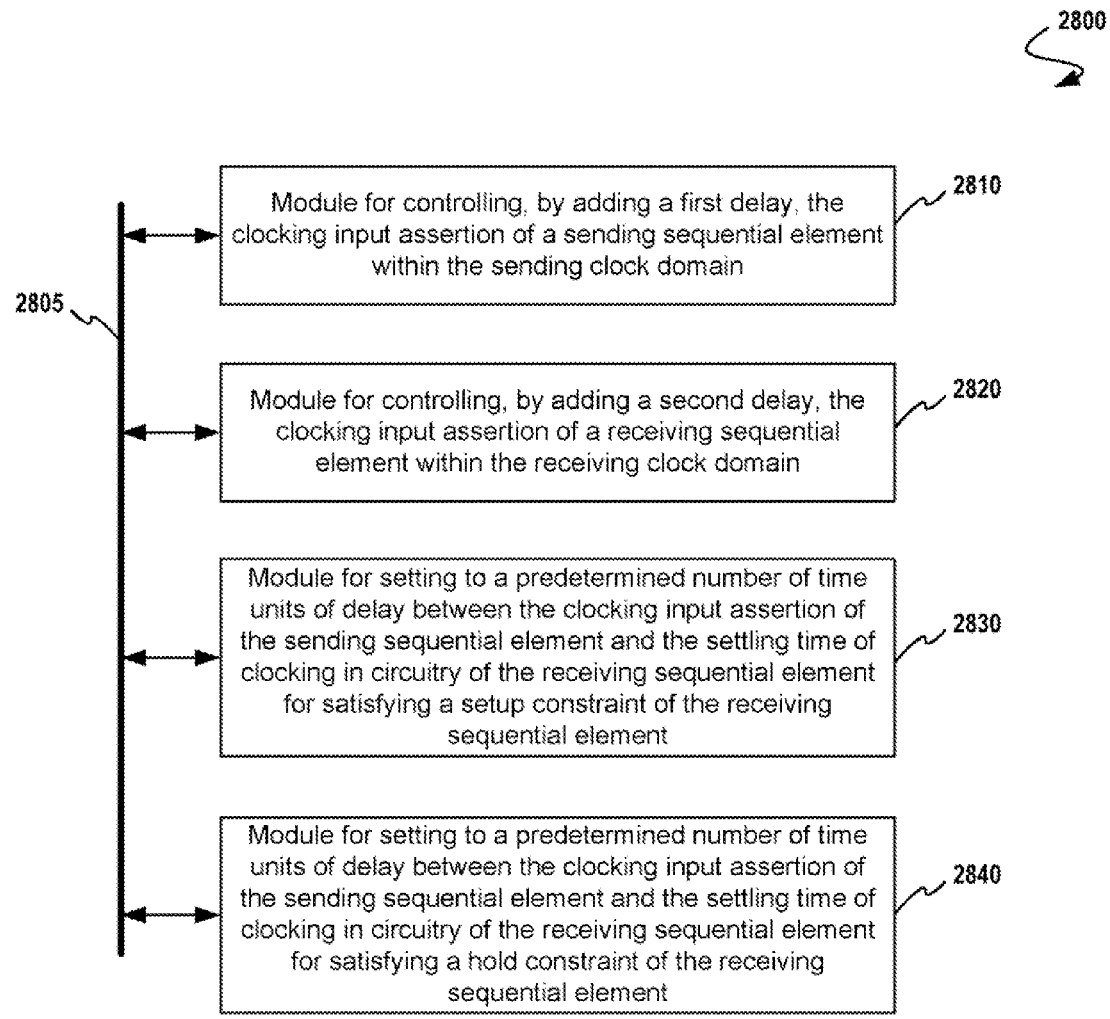
FIG. 28 depicts a block diagram of a system for managing clock domain crossing in digital circuits having a sending clock domain, and a receiving clock domain, according to one embodiment.

FIG. 28 depicts a block diagram of a system for managing clock domain crossing in digital circuits having a sending clock domain, and a receiving clock domain. As an option, the present system 2800 may be implemented in the context of the architecture and functionality of the embodiments described herein. Of course, however, the system 2800 or any operation therein may be carried out in any desired environment. As shown, system 2800 includes a plurality of modules, each connected to a communication link 2805, and any module can communicate with other modules over communication link 2805. The modules of the system can, individually or in combination, perform method steps within system 2800. Any method steps performed within system 2800 may be performed in any order unless as may be specified in the claims. As shown, system 2800 implements a method having a sending clock domain, the system 2800 comprising modules for: controlling, by adding a first delay, the clocking input assertion of a sending sequential element within the sending clock domain (see module 2810); controlling, by adding a second delay, the clocking input assertion of a receiving sequential element within the receiving clock domain (see module 2820); the first delay is set to a predetermined number of time units of delay between the clocking input assertion of the sending sequential element and the settling time of clocking in circuitry of the receiving sequential element for satisfying a setup constraint of the receiving sequential element (see module 2830); and the second delay is set to a predetermined number of time units of delay between the clocking input assertion of the sending sequential element and the settling time of clocking in circuitry of the receiving sequential element for satisfying a hold constraint of the receiving sequential element (see module 2840).

Although the present invention has been described in terms of specific exemplary embodiments, it will be appreciated that various modifications and alterations might be made by those skilled in the art without departing from the spirit and scope of the invention.

What is claimed is:

1. An apparatus for managing a first data signal communication between a first clock domain and a second clock domain comprising:
   a memory having at least one memory bit;
   a memory control module, electrically connected to the memory, and having a first lock delay for controlling a read clocking operation on said memory and a second lock delay for controlling a write clocking operation on said memory; and
   a single memory control logic mutual exclusion circuit electrically connected to the memory control module, wherein the mutual exclusion circuit includes at least two mutual exclusion input signals and at least two mutual exclusion output signals.

2. The apparatus of claim 1, wherein the memory control logic mutual exclusion circuit is configured to avoid generation of the read clocking operation simultaneous with the write clocking operation wherein the first lock delay is configured to introduce a delay between an edge of the first clock to an edge of the second clock, wherein the second lock delay is configured to introduce a delay between an edge of the second clock to an edge of the first clock.

3. The apparatus of claim 1, wherein the memory control module includes a non-blocking asynchronous handshake circuit.

4. The apparatus of claim 3, wherein the non-blocking asynchronous handshake circuit includes signals implementing at least one of, a two-phase protocol, a four-phase protocol.

5. The apparatus of claim 3, wherein the memory control module includes a modulo-n up-down counter.

6. The apparatus of claim 3, wherein the non-blocking asynchronous handshake circuit combines a request signal and an acknowledgement signal.

7. The apparatus of claim 1, wherein the single memory control logic mutual exclusion circuit includes an arbitration function for accessing the memory control module and for avoiding inconsistent information produced by metastability.

8. A method for synthesizing an apparatus for managing a first data signal communication between a first clock domain and a second clock domain, the method comprising:
   outputting a memory having at least one memory bit;
   outputting a memory control module, electrically connected to the memory;
   outputting, from the m mo control module, a first lock delay for controlling a read clocking operation on said memory and a second lock delay for controlling a write clocking operation on said memory; and
   outputting a single memory control logic mutual exclusion circuit electrically connected to the memory control module, wherein the mutual exclusion circuit includes at least two mutual exclusion input signals and at least two mutual exclusion output signals.

9. The method of claim 8, wherein the memory control logic mutual exclusion circuit is configured to avoid generation of the read clocking operation simultaneous with the write clocking operation wherein the first lock delay is configured to introduce a delay between an edge of the first clock to an edge of the second clock, wherein the second lock delay is configured to introduce a delay between an edge of the second clock to an edge of the first clock.

10. The method of claim 8, wherein the memory control module includes a non-blocking asynchronous handshake circuit.

11. The method of claim 10, wherein the non-blocking asynchronous handshake circuit includes signals implementing at least one of, a two-phase protocol, a four-phase protocol.

12. The method of claim 10, wherein the memory control module includes a modulo-n up-down counter.

13. The method of claim 10, wherein the non-blocking asynchronous handshake circuit combines a request signal and an acknowledgement signal.

14. The method of claim 8, wherein the memory control module includes a mutual-exclusion function for accessing the control logic and for avoiding inconsistent information produced by metastability.

* * * * *